United States Patent
Koga et al.

(10) Patent No.: US 7,241,825 B2
(45) Date of Patent: *Jul. 10, 2007

(54) POLYCARBONATE RESIN COMPOSITION, PELLETS THEREOF AND MOLDED ARTICLE THEREOF

(75) Inventors: Takashi Koga, Chiyoda-ku (JP); Mitsuhiro Takeo, Chiyoda-ku (JP); Daisuke Takahashi, Chiyoda-ku (JP)

(73) Assignee: Teijin Chemicals, Ltd., Tokyo (JP)

(*) Notice: Subject to any disclaimer, the term of this patent is extended or adjusted under 35 U.S.C. 154(b) by 108 days.

This patent is subject to a terminal disclaimer.

(21) Appl. No.: 10/483,126

(22) PCT Filed: May 1, 2003

(86) PCT No.: PCT/JP03/05591

§ 371 (c)(1), (2), (4) Date: Jan. 8, 2004

(87) PCT Pub. No.: WO03/095557

PCT Pub. Date: Nov. 20, 2003

(65) Prior Publication Data

US 2004/0152806 A1 Aug. 5, 2004

(30) Foreign Application Priority Data

May 8, 2002 (JP) ............................ 2002-132434
Jun. 27, 2002 (JP) ............................ 2002-187962

(51) Int. Cl.
C08K 5/103 (2006.01)
C08L 69/00 (2006.01)
B32B 27/18 (2006.01)

(52) U.S. Cl. ............... 524/311; 524/306; 524/312; 524/318; 524/611; 428/412

(58) Field of Classification Search ............ 524/115, 524/147, 311, 312; 428/412
See application file for complete search history.

(56) References Cited

U.S. PATENT DOCUMENTS

| 4,131,575 | A | 12/1978 | Adelmann et al. | |
| 6,359,042 | B1 | 3/2002 | Anders et al. | |
| 6,921,784 | B2 * | 7/2005 | Dohi et al. | 524/117 |
| 2001/0041759 | A1 * | 11/2001 | Inoue et al. | 524/145 |
| 2003/0083207 | A1 | 5/2003 | Gorny et al. | |

FOREIGN PATENT DOCUMENTS

| EP | 0 082 354 | | 6/1983 |
| EP | 0 352 458 | | 1/1990 |
| EP | 0 492 550 | | 7/1992 |
| EP | 1138720 A1 | * | 10/2001 |
| GB | 1 567 517 | | 5/1977 |
| JP | 61-41939 | | 9/1986 |
| JP | 1-242660 | | 9/1989 |
| JP | 2-69556 | | 3/1990 |
| JP | 4-253765 | | 9/1992 |
| JP | 5-320472 | | 12/1993 |
| JP | 10-60120 | | 3/1998 |
| JP | 2000-143961 | | 5/2000 |
| JP | 2001049104 A | * | 2/2001 |
| JP | 2001-192543 | | 7/2001 |
| JP | 2001-192544 | | 7/2001 |
| JP | 2001-512149 | | 8/2001 |
| JP | 2001-342337 | | 12/2001 |
| JP | 2003-514090 | | 4/2003 |
| JP | 2003-529653 | | 10/2003 |
| WO | 96/06135 | | 2/1996 |

OTHER PUBLICATIONS

Machine translation of JP 2001-049104, Feb. 20, 2001.*
Full English-language translation of JP 2001-049104, Feb. 20, 2001.*

* cited by examiner

*Primary Examiner*—Vasu Jagannathan
*Assistant Examiner*—Vickey Ronesi
(74) *Attorney, Agent, or Firm*—Wenderoth, Lind & Ponack, L.L.P.

(57) ABSTRACT

The object of the present invention is to provide a polycarbonate resin composition which has excellent transparency and durability against molding heat, which gives a molded article having an excellent mold release property, reduced strains, improved cracking resistance and, preferably, weatherability, and which is particularly suitable for a transparent member for a vehicle, pellets thereof and a molded article thereof, and the present invention provides a polycarbonate resin composition obtained by blending 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, said Component B having a 5% weight loss temperature, measured by TGA (thermogravimetric analysis), of 250 to 360° C. and having an acid value of 4 to 20, pellets thereof and a molded article thereof.

32 Claims, 2 Drawing Sheets

[1-A]

[1-B]

[2-A]

[2-B]

POLYCARBONATE RESIN COMPOSITION, PELLETS THEREOF AND MOLDED ARTICLE THEREOF

TECHNICAL FIELD

The present invention relates to a polycarbonate resin composition, pellets thereof and a molded article thereof. More specifically, it relates to a polycarbonate resin composition which has excellent transparency and durability against molding heat, which gives a molded article having an excellent mold release property, reduced internal strain and improved resistance to cracking and, preferably, further having weatherability, and which is suitable particularly for a transparent member for a vehicle, pellets thereof and a molded article thereof.

TECHNICAL BACKGROUND

A polycarbonate resin has excellent transparency, heat durability, mechanical strength, etc., and is therefore widely used in the fields of electric appliances, machines, automobiles, medical appliances, and the like. A polycarbonate resin is also widely used in various transparent members due to the above various excellent features. Above all, attempts are made to apply a polycarbonate resin to transparent members for vehicles aiming at a decrease in weight. Such transparent members for vehicles include a headlamp lens, a resin windowpane, a rear lamp lens, a meter cover, and the like. Characteristically, these members have complicated forms and large sizes, and molded articles therefor are required to have very high product quality.

When the above members are produced from a polycarbonate resin composition by an injection molding method, the following points may be problems in some cases.

That is, one problem is that it is difficult to obtain a molded article that has an excellent mold releasing property, has little internal strain and is free of the occurrence of cracking. More specifically, when a large amount of a mold release agent is added for imparting the resin with a good mold release property, a molded article is liable either to have an internal strain or to undergo cracking. When the amount of a mold release agent is decreased, the occurrence of cracking increases due to an increase in resistance against mold releasing. Further, the above transparent members are required to have transparency, durability against molding heat and weatherability.

The above internal strain of a molded article is a strain observed as a non-uniform shade portion through a polarizing plate. It is not reduced by any general annealing but, on the contrary, is made conspicuous in some cases (the above strain will be sometimes referred to as "strain-2" for convenience). The strain-2 is liable to occur when molding is carried out at a high temperature with a large molding machine having many residence portions.

A strain observable as a color change in a striped pattern or "dense and less dense" non-uniformity through a polarizing plate is a strain that can be reduced by annealing to some extent (this strain will be sometimes referred to as "strain-1" for convenience). The main factor of the above strain-1 is a strain which individual polymer molecule chains are caused to have due to thermal stress, and the like.

The above strain-1 causes the occurrence of cracking during hard-coating procedures or in long-term properties, so that it is required to reduce the strain-1. While the strain-2 does not cause such problems as visibility when a windowpane or the like is used under natural light, it is sometimes required to reduce the strain-2. The reason therefor will be discussed later.

Further, a transparent member for a vehicle is often subjected to surface treatments such as hard coating treatment. In the hard coating treatment, a molded article sometimes undergoes cracking. The cracking of a molded article will take place even if the molded article is annealed before the hard coating treatment. It is therefore considered that some factors of a polycarbonate resin composition promote the cracking of a molded article during molding and annealing. It is hence required to improve the molded article in resistance to cracking (to be sometimes referred to as "cracking resistance" hereinafter) by reducing the above factors.

As described above, for members for vehicles, there is demanded a polycarbonate resin composition which has excellent transparency and durability against molding heat and gives a molded article having an excellent mold release property, a reduced internal strain and improved cracking resistance and preferably further having weatherability.

The manufacturing of transparent members for vehicles, particularly large members, has features different from the manufacturing of optical disk substrates that are typical molded articles from a polycarbonate resin. The manufacturing of an optical disk substrate is "molding" requiring a very high processing temperature but "molding" of an article having a simple form (a constant thickness and non-complicated flowing of a resin) at a very small cycle. In view of the above points, a resin composition therefor is required to have properties different from those of a resin composition for an optical disk substrate.

Conventionally, a method of adding a fatty acid ester is known as a method of improving the mold release property of a polycarbonate resin, and above all, glycerin monostearate is frequently used. In a polycarbonate resin composition containing glycerin monostearate, however, the above strain-2 is clearly observed, and such a composition cannot be said to be satisfactory in cracking resistance.

As a mold release agent for use in a polycarbonate resin, there is widely known a full ester of an aliphatic polyhydric alcohol and an aliphatic carboxylic acid, such as pentaerythritol tetrastearate. For a polycarbonate resin composition containing the above full ester, there are various proposals made for improving the composition in product quality. The full ester of an aliphatic polyhydric alcohol and an aliphatic carboxylic acid will be sometimes referred to as "fatty acid full ester" hereinafter.

There is disclosed a polycarbonate resin composition containing, as a mold release agent, an ester of pentaerythritol in which the OH group content and acid value of an ester compound are extremely decreased (Patent Document 1).

Further, there is disclosed a polycarbonate resin composition comprising a polycarbonate resin and an internal mold release agent having a full ester content of 90% or more and having an acid value of 0.6 to 1.6, an iodine value of 0.1 to 1.3 and a metal element, Sn, content of 5 to 300 ppm (Patent Document 2).

(Patent Document 1)
JP-A-2-69556
(Patent Document 2)
JP-A-2001-192543

(Objects to be Achieved by the Invention)

It is an object of the present invention to provide a polycarbonate resin composition which has excellent transparency and durability against molding heat, which gives a molded article having an excellent mold release property, reduced internal strain and improved cracking resistance and, preferably, further having weatherability, and which is suitable particularly for a transparent member for a vehicle, pellets thereof and a molded article thereof.

The present inventors have made diligent studies for achieving the above objects.

First, the above problem is that the mold release property imparted by a mold release agent and other properties are not compatible, so that the present inventors have studied types of mold release agents as one solution factor.

Second, the present inventors have made studies causes for cracking. As a result, it has been assumed that a cracking during molding is possibly a solvent cracking caused by the contact of additives partly remaining on a mold surface, such as a mold release agent, etc., to a high-temperature molded article during molding. Particularly, it has been found that since an edge portion of a molded article is liable to have a greater strain, and since a mold release agent, etc., are liable to be deposited in the edge portion, a cracking is liable to occur. While it is considered that a cracking also takes place in hard coating treatment after annealing mainly because a residual stress is not completely removed by the annealing, it is also considered from the above viewpoint that a resin of a molded article surface is partly deteriorated. Therefore, the conclusion obtained concerning these points is that the type of a mold release agent is also essential.

Third, studies have been made with regard to causes for the occurrence of the strain-2. As a result, the following conclusion has been reached. In injection molding, a resin flows into a mold in a fountain flow manner, and the mold is filled with the resin in a manner in which a resin to follow pushes aside a resin that has already flowed in the mold. For example, when the cross-section of the resin is observed, there is observed a state where several flow layers of the resin are stacked. In an injection-molded article having the above properties, when a non-uniform frictional force is caused among the flow layers, the flows of the resin are disordered, there is caused a great difference in density among the flow layers, or the flows of the resin is whirled to reverse upper and lower layers in some cases. It has been found that such states are observed as a non-uniform shade portion in the above observation through a polarizing plate. That is, the non-uniform shade can be said to be a strain of flow layers of a resin. It has been also found that the strain-2 is liable to take place when a thermal load on a resin is excessive. It has been therefore assumed that the non-uniform frictional force among the flow layers is caused by gasification of a decomposition product. Further, it has been found that as the strain-2 becomes more intensely observable, there are more cases where a molded article show defects such as sliver streaks, discoloration and internal fogging (white haze) due to a slight increase in residence time. That is, it can be said that a resin composition having less strain-2 causes almost no molding defects and can be applied widely to a variety of molded articles. Further, when long-term properties are taken into account, molded articles having less strain are more preferred than those having intense strains. When a molded article is used in place of a glass product, when it is applied to an optical product, and when it is applied to an automobile part, the strain-2 is often regarded as a defect. For the above reason, it is sometimes required to decrease the strain-2.

Therefore, to decrease the strain-2, the conclusion that has been reached is that the flow of a resin is required to be smooth and that it is required to incorporate an additive from which a gas and a decomposition substance are less generated. A mold release agent is considered to have the function of making the flow of a resin smooth, and it is considered to be essential to incorporate a mold release agent from which a gas and a decomposition product are less generated.

Following the above studies, the present inventors have further made diligent studies, and as a result, have found that a resin composition prepared by incorporating a specific amount of a specific fatty acid full ester to a polycarbonate resin can overcome the above problems, and the present invention has been accordingly completed.

DISCLOSURE OF THE INVENTION

The present invention is a polycarbonate resin composition obtained by blending 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, said Component B having a 5% weight loss temperature, measured by TGA (thermogravimetric analysis), of 250 to 360° C. and having an acid value of 4 to 20.

Preferably, the aliphatic carboxylic acid constituting the above Component B contains a palmitic acid component and a stearic acid component, and in a peak area by a gas chromatography mass spectrometry method (GC/MS method) thereof, the total of a palmitic acid component area (Sp) and a stearic acid component area (Ss) is at least 80% of the entire aliphatic carboxylic acid component area, and the area ratio of these two components (Ss/Sp) is 1.3 to 30.

The above Component B preferably has a 5% weight loss temperature, measured by TGA (thermogravimetric analysis) of 280 to 360° C. The Component B preferably has an acid value of 4 to 18. The area ratio (Ss/Sp) is preferably 1.3 to 10. The aliphatic polyhydric alcohol preferably has 5 to 10 carbon atoms. The aliphatic polyhydric alcohol preferably represents pentaerythritol and/or dipentaerythritol. The Component B preferably has a hydroxy value in the range of 0.1 to 30. The Component B preferably has an iodine value of 10 or less. It is preferred to incorporate 0.0005 to 1 part by weight, per 100 parts by weight of Component A, of at least one stabilizer (Component C) selected from the group consisting of a phosphorus-containing stabilizer (Component C1) and a hindered-phenol-containing antioxidant (Component C2). It is preferred to incorporate 0.0005 to 3 parts by weight, per 100 parts by weight of Component A, of an ultraviolet absorbent (Component D). It is preferred to incorporate 0.0001 to 3 parts by weight, per 100 parts by weight of Component A, of a fluorescent brightener (Component E). The above polycarbonate resin composition is preferably a composition which shows a haze value in the range of 0.1 to 1% as a smooth flat plate having an arithmetic average roughness (Ra) of 0.03 μm and having a thickness of 2 mm, and which substantially does not contain any filler.

The present invention includes a polycarbonate resin composition comprising 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, the polycarbonate resin composition being a composition in which the molar ratio (Ff:Fe) of the molar amount (Ff) of carboxyl groups of free aliphatic carboxylic acid and the molar amount (Fe) of ester bonds of Component B is in the range of 8:92 to 30:70.

Preferably, the aliphatic carboxylic acid constituting the above Component B contains a palmitic acid component and a stearic acid component, and in a peak area by a gas chromatography mass spectrometry method (GC/MS method) thereof, the total of a palmitic acid component area (Sp) and a stearic acid component area (Ss) is at least 80% of the entire aliphatic carboxylic acid component area, and the area ratio of these two components (Ss/Sp) is 1.3 to 30. The above polycarbonate resin composition preferably contains, per 100 parts by weight of the above Component A, 0.0005 to 1 part by weight of at least one stabilizer (Component C) selected from the group consisting of a phosphorus-containing stabilizer (Component C1) and a hindered-phenol-containing antioxidant (Component C2). The above polycarbonate resin composition preferably contains, per 100 parts by weight of the above Component A, 0.0005 to 3 parts by weight of an ultraviolet absorbent (Component D). The above polycarbonate resin composition preferably contains, per 100 parts by weight of the above Component A, 0.0001 to 3 parts by weight of a fluorescent brightener (Component E).

Further, the present invention includes pellets formed from a resin composition comprising 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, wherein said pellets satisfy the requirement that the mold release load of said pellets in a mold release measurement method is 85% or less of the mold release load, measured by said measurement method, of pellets formed from a resin composition containing said Component A and pentaerythritol tetrastearate which has an acid value of 0.8, has a 5% weight loss temperature, measured by TGA (thermogravimetric analysis), of 396° C., and is incorporated in an amount equivalent to the amount of said. Component B.

Preferably, the molar ratio (Ff:Fe) of the molar amount (Ff) of carboxyl groups of free aliphatic carboxylic acid in said pellets and the molar amount (Fe) of ester bonds of Component B is in the range of 10:90 to 30:70. The aliphatic polyhydric alcohol is preferably pentaerythritol. Preferably, the aliphatic carboxylic acid constituting the above Component B contains a palmitic acid component and a stearic acid component, and in a peak area by a gas chromatography mass spectrometry method (GC/MS method) thereof, the total of a palmitic acid component area (Sp) and a stearic acid component area (Ss) is at least 80% of the entire aliphatic carboxylic acid component area, and the area ratio of these two components (Ss/Sp) is 1.3 to 30. Preferably, the above pellets show a haze value in the range of 0.1 to 1% as a smooth flat plate formed from them having an arithmetic average roughness (Ra) of 0.03 μm and having a thickness of 2 mm, and substantially do not contain any filler.

The present invention includes molded articles formed from the above polycarbonate resin compositions. Further, the present invention includes a molded article formed from the above pellets. The above molded articles preferably have a hard-coat-treated surface. The above molded articles are preferably transparent members for automobiles. The transparent members for automobiles are preferably automobile lamp lenses.

EXPLANATIONS OF SYMBOLS

Figure 1:
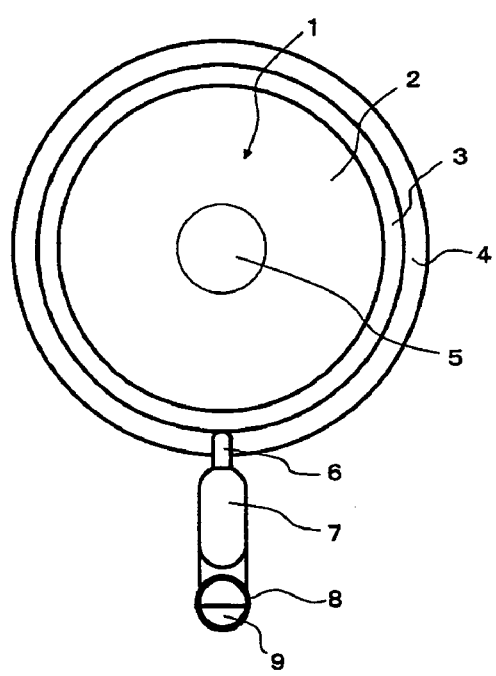
FIG. 1 shows schematic drawings of cup-shaped molded articles used in measurement of mold release loads in Examples. [1-A] is a front view thereof, and [1-B] is a side view thereof. A molded article ejection portion and a Z pin portion are ejected at the same time, thereby to release a molded article from a mold cavity. The molded article ejection portion and the Z pin are fixed to one plate, and the plate is ejected with a load cell top end portion, whereby the molded article is ejected.
Figure 1:
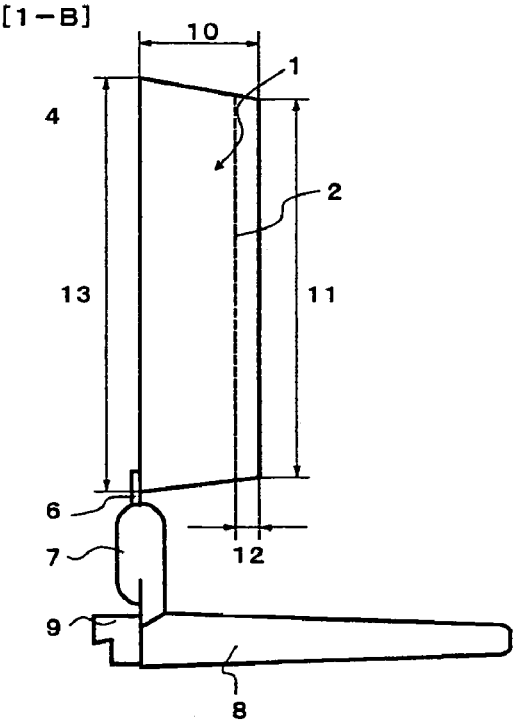

Symbols in the drawings are as follows.
1. Cup-shaped molded article body (thickness 4 mm in every portion)
2. Inside bottom portion of cup-shaped molded article
3. Internal circumferential portion of cup-shaped molded article
4. Upper surface circumferential portion of cup-shaped molded article
5. Ejectable portion of cup-shaped molded article (center of molded article, circular form having a diameter of 15 mm)
6. Gate (width 3 mm, thickness 1.5 mm)
7. Runner (diameter 8 mm, upside and downside portions have semi-spherical forms, and central portion has a cylindrical form)
8. Sprue (length 60 mm)
9. Z pin portion (diameter 8 mm, length 8 mm)
10. Height of cup-shaped molded article (20 mm)
11. Diameter of bottom surface side of cup-shaped molded article (63 mm)
12. Thickness of bottom of cup-shaped molded article (4 mm)
13. Diameter of cup-shaped molded article (70 mm)
21. Headlamp lens body
22. Dome-shaped portion of lens
23. Circumferential portion of lens
24. Gate of molded article (width 30 mm, gate portion thickness 4 mm)
25. Sprue (gate portion diameter 7 mmφ)
26. Diameter of circumferential portion of lens (220 mm)
27. Diameter of dome portion of lens (200 mm)
28. Height of dome portion of lens (20 mm)
29. Thickness of lens molded article (4 mm)

PREFERRED EMBODIMENTS OF THE INVENTION

The present invention will be explained in detail hereinafter.

First Embodiment

The first embodiment of the present invention is a polycarbonate resin composition obtained by blending 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, said Component B having a 5% weight loss temperature, measured by TGA (thermogravimetric analysis), of 250 to 360° C. and having an acid value of 4 to 20.

(Polycarbonate Resin: Component A)

The polycarbonate resin for use as Component A in the present invention is a product obtained by reacting a dihydric phenol with a carbonate precursor. Examples of the method of the above reaction include an interfacial polymerization method, a molten ester exchange method, a solid phase ester exchange method of a carbonate prepolymer, and a ring-opening polymerization method of a cyclic carbonate compound.

Typical examples of the above dihydric phenol include hydroquinone, resorcinol, 4,4'-biphenol, 1,1-bis(4-hydroxyphenyl)ethane, 2,2-bis(4-hydroxyphenyl)propane (so-called bisphenol A), 2,2-bis(4-hydroxy-3-methylphenyl) propane, 2,2-bis(4-hydroxyphenyl)butane, 1,1-bis(4-hydroxyphenyl)-1-phenylethane, 1,1-bis(4-hydroxyphenyl) cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl) sulfone, bis(4-hydroxy-3-methylphenyl)sulfide, 9,9-bis(4-hydroxyphenyl)fluorene and 9,9-bis(4-hydroxy-3-methylphenyl)fluorene. The polycarbonate resin in the present invention can be any one of a homopolymer of any one of the above dihydric phenols and a copolymer of two or more dihydric phenols of them.

Above all, the polycarbonate resin is preferably selected from a homopolymer of bis(4-hydroxyphenyl)alkane such as bisphenol A and a copolymer formed from at least two members selected from 1,1-bis(4-hydroxyphenyl)-3,3,5-trimethylcyclohexane, bis(4-hydroxyphenyl)alkane (bisphenol A, or the like), 2,2-bis{(4-hydroxy-3-methyl) phenyl}propane, α,α'-bis(4-hydroxyphenyl)-m-diisopropylbenzene and 9,9-bis(4-hydroxy-3-methylphenyl)fluorene. A homopolymer of bisphenol A is particularly preferred.

The carbonate precursor is selected from carbonyl halide, carbonic acid diester or haloformate, specifically from phosgene, diphenyl carbonate or dihaloformate of a dihydric phenol.

When the polycarbonate resin is produced from the above dihydric phenol and the above carbonate precursor by any one of the above polymerization methods, a catalyst, a terminal stopper and an antioxidant for preventing oxidation of the dihydric phenol may be used as required. Further, the polycarbonate resin in the present invention includes a branched polycarbonate resin obtained by copolymerization of a polyfunctional aromatic compound having three or more functional groups, a polyester carbonate resin obtained by copolymerization of an aromatic or aliphatic (including alicyclic) difunctional carboxylic acid, a copolycarbonate resin obtained by copolymerization of a dihydric alcohol (including an alicyclic alcohol), and a polyester carbonate resin obtained by copolymerization of both of the above difunctional carboxylic acid and dihydric alcohol. The polycarbonate resin in the present invention may be a mixture of two or more members of the thus-obtained polycarbonate resins.

The polyfunctional aromatic compound having three or more functional groups can be selected from 1,1,1-tris(4-hydroxyphenyl)ethane or 1,1,1-tris(3,5-dimethyl-4-hydroxyphenyl)ethane.

When a polyfunctional compound that produces a branched polycarbonate is contained, the content thereof in the entire aromatic polycarbonate is 0.001 to 1 mol %, preferably 0.005 to 0.9 mol %, particularly preferably 0.01 to 0.8 mol %. In a molten ester exchange method in particular, a branched structure may be formed as a side reaction. The content of such a branched structure in the entire aromatic polycarbonate is 0.001 to 1 mol %, preferably 0.005 to 0.9 mol %, particularly preferably 0.01 to 0.8 mol %. The above contents can be calculated on the basis of $^1$H-NMR measurement.

The aliphatic difunctional carboxylic acid is preferably α,ω-dicarboxylic acid. Examples of the aliphatic difunctional carboxylic acid include linear saturated aliphatic dicarboxylic acids such as sebacic acid (decanoic diacid), dodecanoic diacid, tetradecanonic diacid, octadecanoic diacid and icosanoic diacid, and alicyclic dicarboxylic acids such as cyclohexanedicarboxylic acid. The dihydric alcohol is more preferably an alicyclic diol and includes, for example, cyclohexanedimethanol, cyclohexanediol and tricyclodecanedimethanol.

Further, there can be also used a polycarbonate-polyorganosiloxane copolymer obtained by copolymerization of a polyorganosiloxanes unit.

The reaction by an interfacial polymerization method is generally a reaction between a dihydric phenol and phosgene, and the reaction is carried out in the presence of an acid coupling agent and an organic solvent. The acid coupling agent is selected, for example, from alkali metal hydroxides such as sodium hydroxide and potassium hydroxide or pyridine.

The organic solvent is selected, for example, from halogenated hydrocarbons such as methylene chloride and chlorobenzene.

Further, a catalyst such as a tertiary amine or a quaternary ammonium salt may be used for promoting the reaction, and it is preferred to use a monohydric phenol such as phenol, p-tert-butylphenol or p-cumylphenol as a molecular weight adjusting agent. Further, the monohydric phenol also includes decylphenol, dodecylphenol, tetradecylphenol, hexadecylphenol, octadecylphenol, eicosylphenol, docosylphenol and triacontylphenol. The above monohydric phenols having a relatively long linear alkyl group are effective when it is required to improve flowability and hydrolysis resistance.

Preferably, the reaction temperature is generally 0 to 40° C., the reaction time period is several minutes to 5 hours, and the pH during the reaction is generally maintained at 10 or more.

The reaction according to a melting method is generally an ester exchange reaction between the dihydric phenol and a carbonic acid diester, and the dihydric phenol and the carbonic acid diester are mixed in the presence of an inert gas and reacted under reduced pressure generally at 120 to 350° C. The pressure reduction degree is changed stepwise, and the pressure is finally adjusted to 133 Pa or lower to remove formed phenols out of the system. The reaction time period is generally approximately 1 to 4 hours.

Examples of the carbonic acid diester include diphenyl carbonate, dinaphthyl carbonate, bis(diphenyl) carbonate, dimethyl carbonate, diethyl carbonate and dibutyl carbonate, and of these, diphenyl carbonate is preferred.

For increasing the polymerization rate, a polymerization catalyst may be used. The polymerization catalyst includes catalysts that are used for general esterification reactions or ester exchange reactions, and examples thereof include hydroxides of an alkali metal or an alkaline earth metal such as sodium hydroxide and potassium hydroxide, hydroxides of boron and aluminum, an alkali metal salt, an alkaline earth metal salt, a quaternary ammonium salt, an alkoxide of alkali metal or alkaline earth metal, an organic acid salt of an alkali metal or alkaline earth metal, a zinc compound, a boron compound, a silicon compound, a germanium compound, an organotin compound, a lead compound, an antimony compound, a manganese compound, a titanium compound and a zirconium compound. These catalysts may be used alone, or two or more members thereof may be used in combination. The amount of the above catalyst per mole of the dihydric phenol as a raw material is preferably in the range of $1 \times 10^{-8}$ to $1 \times 10^{-3}$ equivalent weight, more preferably in the range of $1 \times 10^{-7}$ to $5 \times 10^{-4}$ equivalent weight.

In the polymerization reaction, a compound such as 2-chlorophenylphenyl carbonate, 2-methoxycarbonylphenylphenyl carbonate or 2-ethoxycarbonylphenylphenyl carbonate may be added at a later stage of, or after, a polycondensation reaction, for decreasing phenolic terminal groups.

In the molten ester exchange method, further, it is preferred to use a deactivator for neutralizing the activity of the catalyst. The above deactivator is preferably used in an amount of 0.5 to 50 mol per mole of a remaining catalyst. Further, the amount of the deactivator used on the basis of the aromatic polycarbonate after the polymerization is 0.01 to 500 ppm, more preferably 0.01 to 300 ppm, particularly preferably 0.01 to 100 ppm. The deactivator preferably includes phosphonium salts such as dodecylbenzenesulfonic acid tetrabutylphosphonium salt, and ammonium salts such as tetraethylammoniumdodecylbenzyl sulfate.

Particulars of the reaction method other than the above-explained method are also well known in literatures and patent publications.

The molecular weight of the polycarbonate resin is preferably 10,000 to 100,000, more preferably 15,000 to 30,000, still more preferably 17,000 to 27,000, particularly preferably 18,000 to 25,000. When a polycarbonate resin having the above viscosity average molecular weight is used, the resin composition of the present invention has sufficient strength and excellent melt-flowability during molding. The excellent melt-flowability is preferred since it makes it possible to further decrease the molding-induced strains. Further, when the viscosity average molecular weight is in the above range, a molded article comes to have sufficient durability against post treatments such as hard coating treatment. The above polycarbonate resin may be a mixture containing a polycarbonate resin having a viscosity average molecular weight outside the above range.

The viscosity average molecular weight (M) of the polycarbonate resin is a value obtained by determining a specific viscosity ($\eta_{sp}$) from a solution of 0.7 g of a polycarbonate resin in 100 ml of methylene chloride at 20° C. and inserting the specific viscosity to the following expression.

$\eta_{sp}/c=[\eta]+0.45\times[\eta]^2 c([\eta]$ is an intrinsic viscosity)

$[\eta]=1.23\times 10^{-4} M^{0.83}$ c=0.7

The polycarbonate resin of the present invention includes the following embodiment. That is, there can be used an aromatic polycarbonate which contains an aromatic polycarbonate (PC1) having a viscosity average molecular weight of 70,000 to 300,000 and an aromatic polycarbonate (PC2) having a viscosity average molecular weight of 10,000 to 30,000, and which has a viscosity average molecular weight of 15,000 to 40,000, preferably, 20,000 to 30,000 (to be sometimes referred to as "high-molecular-weight-component-containing aromatic polycarbonate hereinafter"). The above high-molecular-weight-component-containing aromatic polycarbonate increases entropy elasticity of a polymer due to the presence of PC1 and is advantageous for injection press molding that is suitably employed for large-size molded articles. For example, an appearance defect such as a hesitation mark can be reduced, and the conditional margin of the injection press molding can be broadened to that extent. On the other hand, the low-molecular-weight component as PC2 component decreases the melt viscosity and promotes the relaxation of the resin, so that molding with low strain can be made. The above effect is also observed when a polycarbonate resin containing a branched component is used.

(Fatty Acid Full Ester: Component B)

The Component B for use in the present invention is a full ester from an aliphatic polyhydric alcohol having 4 to 8 hydroxyl groups and 5 to 30 carbon atoms and an aliphatic carboxylic acid having 10 to 22 carbon atoms, said Component B having a 5% weight loss temperature, measured by TGA (thermogravimetric analysis), of 250 to 360° C. and having an acid value of 4 to 20. The "full ester" in the present invention is not necessarily required to be an ester having an esterification ratio of 100%, and the esterification ratio can be 80% or more and is preferably 85% or more.

(TGA)

In the present invention, it has been found that when the 5% weight loss temperature (to be sometimes referred to as "weight loss temperature" hereinafter) in TGA (thermogravimetric analysis) measurement of Component B satisfies 250 to 360° C., a decrease in the mold release strength (improvement in mold release property) can be attained over a conventional full ester. Further, the full ester satisfying the above condition is excellent in cracking resistance. When the weight loss temperature exceeds 360° C., it is difficult to decrease the mold release strength. The weight loss temperature is preferably 250° C. or higher, since a weight loss temperature that is too low is insufficient for heat durability, and such a full ester can cause discoloration or can degrade cracking resistance. The weight loss temperature is more preferably in the range of 280 to 360° C., still more preferably in the range of 300 to 350° C., particularly preferably in the range of 310 to 340° C.

The weight loss temperature can be determined as a temperature at which a 5% weight loss is observed under measurement conditions where the temperature is increased from 23° C. to 600° C. at a temperature elevation rate of 20° C./minute in nitrogen gas ambience in a TGA measurement apparatus.

(Acid Value)

In the present invention, further, it has been found that when the acid value of Component B satisfies the range of 4 to 20, a decrease in the mold release strength (improvement in mold release property), a decrease in strains (particularly, the strain-2) inside a molded article and an improvement in cracking resistance can be attained over a conventional full ester. When the acid value is less than 4, it is difficult to decrease the mold release strength. When the acid value exceeds 20, such a full ester is undesirable in view of thermal stability. The above acid value is more preferably in the range of 4 to 18, still more preferably in the range of 5 to 15. The fatty acid full ester as Component B for use in the present invention contains an acid component such as a free fatty acid, etc., in an amount corresponding to the acid value thereof. The above acid value is an amount, represented by mg, of potassium hydroxide required for neutralizing a free fatty acid, etc., contained in 1 g of a sample, and can be determined by a method defined in JIS K 0070.

While it is not clear why a fatty acid full ester that satisfies the above conditions decrease the mold release strength (improves the mold release property), reduces strains inside a molded article and improves the cracking resistance, the reason therefor can be considered as follows. When the weight loss temperature is in the temperature range of not higher than 360° C. which temperature range corresponds to the melt-processing temperature of a polycarbonate resin, the fatty acid full ester is excellent in heat durability and generates a volatile component to some extent. The above volatile component is gasified during molding and is therefore likely to be segregated on the forward end of a fountain flow generated when a resin is charged into a mold, and it is considered that, as a result, a high concentration of it is segregated on a molded article surface. In this manner, the mold release property can be further improved. Further, the object to be measured on the basis of the acid value is mainly an unreacted free carboxylic acid, and it is easily gasified during molding due to its relatively low molecular weight. It is considered that the above free carboxylic acid is segregated on a molded article surface and serves to improve the mold release property. Therefore, the acid value and the weight loss temperature have a correlation to some extent (when fatty acid full esters of the same type are compared, the weight loss temperature decreases with an increase in the acid value).

On the other hand, gasified components may be a factor that causes a non-uniform frictional force between flow layers of a resin, and the strain-2 may possibly increase. Since, however, the present invention uses the full ester, the lubricity between polycarbonate molecules can be improved as compared with half esters. When the resin flows inside a mold come to be complicated, the resin flows can be therefore made smooth, and it is considered that since such an effect is superior, the strain (strain-2) inside a molded article can be reduced. That is, when the frictional force between molecules is high, a locally generated non-uniform frictional force disorders the flows of a resin. However, it is considered that when the entire frictional force is low, the effect thereof is not likely to be produced. It is also assumed that it is because the volatile components have a proper amount ratio and are not any components that increase as a series like a decomposition gas that the strain caused by the disorder of the flows of a resin does not increase.

Further, Component B is a full ester, and it has good chemical resistance itself and makes only a mild attack on the polycarbonate resin. It is considered that a molded article is thereby improved in cracking resistance. It is considered that the above effect, particularly, the effect of decreasing the attack on the polycarbonate resin and inhibiting the degradation of the polycarbonate resin, is more effective by using Component B in combination with a phosphorus-containing stabilizer or hindered-phenol-containing antioxidant to be described later.

The mold release strength can be improved by making it possible to allow some gasification component to migrate to a surface as described above, and preferred embodiments of the present invention are intricate mixtures of various components, so that it is very rational to identify the constitution of the present invention in terms of the weight loss temperature and acid value of the fatty acid full ester (Component B).

The above fatty acid full ester as Component B in the present invention generally includes not only an ester compound per se but also admixture of such a compound with a free aliphatic carboxylic acid compound. Further, the acid value and the value of the weight loss temperature change depending upon the amount ratio of the free aliphatic carboxylic acid as described above, whereby it is therefore possible to prepare a fatty acid ester having an intended acid value and an intended weight loss temperature by separately adding an aliphatic carboxylic acid to a fatty acid full ester having a low acid value or a high weight loss temperature. Similarly, it is also possible to prepare a fatty acid full ester that satisfies the conditions of the present invention by mixing two or more fatty acid esters having different acid values and different weight loss temperatures.

(Method of Preparation of Fatty Acid Full Ester)

The method of preparing the above specific fatty acid full ester is not particularly limited, and there can be employed conventionally known various methods of reacting an aliphatic polyhydric alcohol and an aliphatic carboxylic acid. For satisfying the specific conditions of the present invention, preferably, an aliphatic polyhydric alcohol is reacted with a slightly excess amount of an aliphatic carboxylic acid and the reaction is terminated at a relatively early stage rather than reacting theoretically equivalent amounts of an aliphatic polyhydric alcohol and an aliphatic carboxylic acid for a sufficient time period to complete the reaction.

Examples of the reaction catalyst include sodium hydroxide, potassium hydroxide, barium hydroxide, calcium hydroxide, calcium oxide, barium oxide, magnesium oxide, zinc oxide, sodium carbonate, potassium carbonate and organotin compounds such as 2-ethylhexyltin.

(Aliphatic Polyhydric Alcohol)

The polyhydric alcohol for use as Component B is an aliphatic polyhydric alcohol having 4 to 8 hydroxyl groups and 5 to 30 carbon atoms. The number of hydroxyl groups of the aliphatic polyhydric alcohol is preferably 4 to 6, and the number of carbon atoms thereof is preferably 5 to 12, more preferably 5 to 10. The aliphatic polyhydric alcohol may contain an ether bond in its carbon chain. Specific examples of the aliphatic polyhydric alcohol include pentaerythritol, dipentaerythritol, tripentaerythritol, polyglycerol (triglycerol-hexaglycerol), ditrimethylolpropane, xylitol, sorbitol and mannitol. Of these, pentaerythritol and dipentaerythritol are preferred, and pentaerythritol is particularly preferred.

(Aliphatic Carboxylic Acid)

Examples of the aliphatic carboxylic acid having 10 to 22 carbon atoms, for use as Component B, include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, eicosanoic acid and docosanoic acid, and unsaturated aliphatic carboxylic acids such as palmitoleic acid, oleic acid, linoleic acid, linolenic acid, eicosenoic acid, eicosapentaenoic acid and cetoleic acid.

Of those described above, aliphatic carboxylic acids having 14 to 20 carbon atoms are preferred, and above all, saturated aliphatic carboxylic acids are preferred. Stearic acid and palmitic acid are particularly preferred.

Aliphatic carboxylic acids such as stearic acid and palmitic acid are generally produced from natural oils and fats such as animal fats (beef tallow and lard) and plant oils (palm oil). Therefore, aliphatic carboxylic acids such as stearic acid are generally mixtures containing other carboxylic acid components having different numbers of carbon atoms. In the preparation of Component B in the present invention, there is preferably used stearic acid or palmitic acid that is produced from natural oils and fats and is in the form of a mixture containing other carboxylic acid component(s). The amount ratio of components of the above mixture is preferably as follows.

(Ss/Sp)

That is, preferably, the aliphatic carboxylic acid constituting Component B contains a palmitic acid component and a stearic acid component, and in a peak area in its thermal decomposition methylation GC/MS (gas chromatography-mass spectrometry) method, the total of a palmitic acid component area (Sp) and a stearic acid component area (Ss) is at least 80% of the entire aliphatic carboxylic acid component area, and the area ratio (Ss/Sp) of these two components is from 1.3 to 30.

The above thermal decomposition methylation GC/MS method refers to a method in which a fatty acid full ester as a sample and methyl ammonium hydroxide as a reagent are reacted on pyrofoil to decompose the fatty acid full ester and to generate methyl ester derivatives of fatty acids, and the derivatives are subjected to GC/MS measurement.

The above total of Sp and Ss based on the entire aliphatic carboxylic acid component area is preferably at least 85%, more preferably at least 90%, still more preferably 91%. While the above total of Sp and Ss can be adjusted to 100%, it is preferably 98% or less, more preferably 96% or less from the viewpoint of a production cost, and the like. The above area ratio (Ss/Sp) is preferably in the range of 1.3 to 30, more preferably in the range of 1.3 to 10, still more preferably in the range of 1.3 to 4, particularly preferably in the range of 1.3 to 3. It is not necessarily required to use an aliphatic carboxylic acid of one type to satisfy the above mixing ratio, and two or more aliphatic carboxylic acids may be mixed to satisfy it.

Examples of the oils and fats as raw materials for the aliphatic carboxylic acid that satisfies the above mixing ratio include animal fats such as beef tallow and lard and plant oils such as linseed oil, safflower oil, sunflower oil, soybean oil, corn oil, groundnut oil, cotton oil, sesame oil and olive oil. Of the above oils and fats, animal fats are preferred since they contain a larger amount of stearic acid, and beef tallow is more preferred. Of the beef tallow, oleostearin, which contains a larger amount of saturated components such as stearic acid and palmitic acid, is preferred.

(Hydroxyl Value)

Further, Component B preferably has a low hydroxyl value in view of thermal stability, a decrease in mold release strength and cracking resistance. However, it is too low, undesirably, the production time period increases to increase the cost. The hydroxyl value of Component B is properly in the range of 0.1 to 30, preferably in the range of 1 to 30, more preferably in the range of 2 to 20. The above hydroxyl value refers to an amount, represented by mg, of potassium hydroxide required for neutralizing acetic acid bonded to hydroxyl groups when 1 g of a sample is acetylated, and it can be determined by a method defined in JIS K 0070.

(Iodine Value)

Component B in the present invention preferably has a low iodine value in view of thermal stability. The iodine value of Component B is preferably 10 or less, more preferably 1 or less. The above iodine value refers to an amount obtained by converting an amount of bonding halogen when halogen is reacted with 100 g of a sample to an amount, represented by g, of iodine, and it can be determined by a method defined in JIS K 0070.

Further, the polycarbonate resin composition of the present invention has an effect that a very small amount of a carbide generated in a molded article formed therefrom can be reduced. Such a carbide scatters light depending upon the intensity of a light source or the angle of light, so that it is sometimes observed in the form of a white stripe (white haze) in a molded article. From this viewpoint, the polycarbonate resin composition of the present invention also has suitable properties.

The amount of the fatty acid full ester as Component B per 100 parts by weight of the polycarbonate resin (Component A) is 0.005 to 2 parts by weight, preferably 0.01 to 1 part by weight, more preferably 0.05 to 0.5 part by weight. When the content of the fatty acid full ester as Component B is too small outside the above range, the improvement in mold release property is not sufficient, and the cracking resistance is low. When the content of the fatty acid full ester as Component B is too large outside the above range, the transparency of a molded article is impaired, and the cracking resistance may be sometimes decreased due to a decrease in durability against molding heat.

(Phosphorus-Containing Stabilizer: Component C1)

Examples of the phosphorus-containing stabilizer (Component C1) included in Component C include those which are already known as a heat stabilizer for a polycarbonate resin, such as phosphorous acid, phosphoric acid, phosphonous acid, phosphonic acid and esters of these.

Examples of the phosphite compound include triphenyl phosphate, tri(nonylphenyl) phosphite, tridecyl phosphate, trioctyl phosphite, trioctadecyl phosphate, didecyl monophenyl phosphate, dioctyl monophenyl phosphite, diisopropyl monophenyl phosphate, monobutyl diphenyl phosphate, monodecyl diphenyl phosphite, monooctyl diphenyl phosphite, 2,2-methylenebis(4,6-di-tert-butylphenyl)octyl phosphite, tris(diethylphenyl) phosphate, tris(di-iso-propylphenyl) phosphite, tris(di-n-butylphenyl) phosphate, tris(2,4-di-tert-butylphenyl) phosphate, tris(2,6-di-tert-butylphenyl) phosphate, distearyl pentaerythritol diphosphite, bis(2,4-di-tert-butylphenyl)pentaerythritol diphosphite, bis(2,6-di-tert-butyl-4-methylphenyl) pentaerythritol diphosphite, bis(2,6-di-tert-butyl-4-ethylphenyl) pentaerythritol diphosphite, phenyl bisphenol A pentaerythritol diphosphite, bis(nonylphenyl)pentaerythritol diphosphite and dicyclohexyl pentaerythritol diphosphite.

As other phosphite compounds, further, there are included those having a ring structure formed by a reaction with dihydric phenols. Examples of such phosphite compounds include 2,2'-methylenebis(4,6-di-tert-butylphenyl)(2,4-di-tert-butylphenyl) phosphite, 2,2'-methylenebis(4,6-di-tert-butylphenyl)(2-tert-butyl-4-methylphenyl) phosphite, 2,2'-methylenebis(4-methyl-6-tert-butylphenyl)(2-tert-butyl-4-methylphenyl) phosphite and 2,2'-ethylidenebis(4-methyl-6-tert-butylphenyl)(2-tert-butyl-4-methylphenyl) phosphite.

Examples of the phosphate compound include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate and diisopropyl phosphate. Triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'- biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonite and bis(di-tert-butylphenyl)-phenyl-phenyl phosphonite are preferred. Tetrakis(2,4-di-tert-butylphenyl)-biphenylene diphosphonite and bis(2,4-di-tert-butylphenyl)-phenyl-phenyl phosphonite are more preferred. The above phosphonite compounds are preferably can be used in combination of the above phosphate compound having an aryl group in which two or more alkyl groups are substituted.

The phosphonate compound includes dimethyl benzenephosphonate, diethyl benzenephosphonate and dipropyl benzenephosphonate.

Not only the above phosphorus-containing stabilizers may be used alone, but also a mixture of two or more members of them may be used. Of the above phosphorus-containing stabilizers, the phosphate compound and the phosphonite compound are preferred. Tris(2,4-di-tert-butylphenyl) phosphite, tetrakis(2,4-di-tert-butylphenyl)-4,4'-biphenylene diphosphonite and bis(2,4-di-tert-butylphenyl)-phenyl-phenyl diphosphonite are particularly preferred. In a preferred embodiment, these are used in combination with the phosphate compound. (Hindered-phenol-containing antioxidant: Component C2)

The hindered-phenol-containing antioxidant (Component C2) included in Component C for use in the present invention can be selected from antioxidants applicable to various resins. Examples of the hindered-phenol-containing antioxidant include a-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylenebis(6-a-methyl-benzyl-p-cresol), 2,2'-ethylidenebis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexanediolbis[3-(3,5-di-tert-butyl-4-hydroxyphenyl)propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis-[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl)propionyloxy] ethylisocyanurate, and tetrakis[methylene-3-(3',5'-di-tert-butyl-4-hydroxypheyl)propionate]methane. These are easily available. The above hindered-phenol-containing antioxidants may be used alone, or a mixture of two or more members of them may be used.

The amount of the stabilizer as Component C per 100 parts by weight of Component A is preferably 0.0005 to 1 part by weight. More preferably, the amount of Component C per 100 parts by weight of Component A is 0.01 to 0.5 part by weight, still more preferably 0.005 to 0.3 part by weight, particularly preferably 0.01 to 0.2 part by weight.

In a more preferred embodiment, Component C contains both the phosphorus-containing stabilizer as Component C1 and the hindered-phenol-containing antioxidant as Component C2. Therefore, preferably, per 100 parts by weight of Component A, the amount of Component C1 is 0.0002 to 0.4 part by weight, the amount of Component C2 is 0.0002 to 0.8 part by weight, and the total amount of Components C1 and C2 is 0.0005 to 1 part by weight. More preferably, per 100 parts by weight of Component A, the amount of Component C1 is 0.0005 to 0.3 part by weight, the amount of Component C2 is 0.0005 to 0.6 part by weight, and the above total amount is 0.001 to 0.5 part by weight. Still more preferably, per 100 parts by weight of Component A, the amount of Component C1 is 0.002 to 0.2 part by weight, the amount of Component C2 is 0.002 to 0.4 part by weight, and the above total amount is 0.005 to 0.3 part by weight. Particularly preferably, per 100 parts by weight of Component A, the amount of Component C1 is 0.005 to 0.1 part by weight, the amount of Component C2 is 0.005 to 0.15 part by weight, and the above total amount is 0.01 to 0.2 part by weight.

(Ultraviolet Absorbent: Component D)

The above polycarbonate resin composition of the present invention is suitable for transparent members for an automobile, such as a headlamp lens, a resin windowpane, a rear lamp lens, a meter cover, and the like. Since these members are required to have weatherability, the polycarbonate resin of the present invention preferably further contains an ultraviolet absorbent (Component D).

Specifically, examples of the ultraviolet absorbent as Component D in the present invention include benzophenone-containing ultraviolet absorbents such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydriderate-benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Specific examples of the ultraviolet absorbent as Component D also include benzotriazole-containing ultraviolet absorbents such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)

benzotriazole, 2-(2-hydroxy-5-tert-butylphenyl) benzotriazole, 2-(2-hydroxy-4-octoxyphenyl)benzotriazole, 2,2'-methylenebis-(4-cumyl-6-benzotriazolphenyl), 2,2'-p-phenylenebis-(1,3-benzoxazin-4-one), and 2-[2-hydroxy-3-(3,4,5,6-tetrahydrophthalimidemethyl)-5-methylphenyl] benzotriazole, polymers having 2-hydroxyphenyl-2H-benzotriazole skeleton such as a copolymer from 2-(2'-hydroxy-5-methacryloxyethylphenyl)-2H-benzotriazole and a vinyl monomer copolymerizable with such a monomer, and a copolymer from 2-(2'-hydroxy-5-acryloxyethylphenyl)-2H-benzotriazole and a vinyl monomer copolymerizable with such a monomer.

Specific examples of the ultraviolet absorbent as Component D also include hydroxyphenyltriazine-containing ultraviolet absorbents such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, the ultraviolet absorbent includes compounds having structures in which each phenyl group of the above compounds is replaced with a 2,4-dimethylphenyl group, such as 2-(4,6-bis(2,4-dimethylphenyl)-1,3,5-triazin-2-yl)-5-hexyloxyphenol, and the like.

Further, the ultraviolet absorbent includes a cyclic iminoester compounds of the following formula (1).

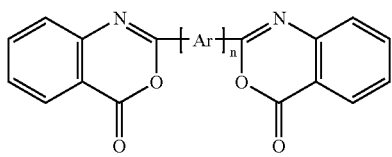

wherein Ar is a residue structured by removing 2 hydrogen atoms on the aromatic ring of an aromatic hydrocarbon having 6 to 12 carbon atoms, and may contain a hetero atom, and n is 0 or 1.

Examples of the compound of the above formula (1) include 2,2'-p-phenylenebis(3,1-benzoxazin-4-one), 2,2'-m-phenylenebis(3,1-benzoxazin-4-one), 2,2'-p,p'-diphenylenebis(3,1-benzoxazin-4-one).

The above ultraviolet absorbent may have a structure of a radical-polymerizable monomer compound and hence may be in the form of a polymer type ultraviolet absorbent in which such an ultraviolet absorbent monomer and/or photostabilizer monomer and a monomer such as an alkyl (meth)acrylate are copolymerized. Examples of the above ultraviolet absorbent monomer preferably include a compound having a structure in which a benzotriazole skeleton, a benzophenone skeleton, a triazine skeleton or a cyclic iminoester skeleton is contained in an ester substituent of a (meth)acrylic acid ester.

Of the above compounds, benzotriazole-containing and hydroxyphenyltriazine-containing ultraviolet absorbents are preferred, and benzotriazole-containing ultraviolet absorbents are particularly preferred for a headlamp lens. The above ultraviolet absorbents may be used alone, or a mixture of two or more of them may be used.

The amount of the ultraviolet absorbent per 100 parts by weight of the polycarbonate resin is preferably 0.0005 to 3 parts by weight, more preferably 0.01 to 2 parts by weight, still more preferably 0.02 to 1 part by weight, particularly preferably 0.005 to 0.5 part by weight.

(Fluorescent Brightener: Component E)

The fluorescent brightener as Component E includes coumarin fluorescent brighteners, naphthalimide fluorescent brighteners and benzoxazolyl fluorescent brighteners. Of these, coumarin fluorescent brighteners are preferred, and a fluorescent brightener of the following formula (2) is particularly preferred.

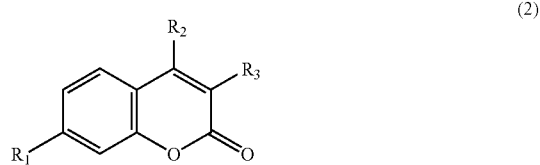

wherein $R_1$ is an amino group, a derivative thereof or a hydroxyl group, each of $R_2$ and $R_3$ is a hydrogen atom, an alkyl group or a phenyl group.

The amount of the fluorescent brightener per 100 parts by weight of Component A is preferably 0.0001 to 3 parts by weight, more preferably 0.0005 to 1 part by weight, still more preferably 0.0005 to 0.5 part by weight, particularly preferably 0.001 to 0.5 part by weight, most preferably 0.001 to 0.1 part by weight.

(Haze Value)

Preferably, the above polycarbonate resin composition shows a haze value in the range of 0.1 to 1% as a 2 mm thick smooth flat plate having an arithmetic average roughness (Ra) of 0.03 μm, and substantially contains no filler. The haze value is preferably in the range of 0.1 to 0.5%.

The haze value is measured with a hazemeter. The above smooth flat plate is obtained by drying pellets according to a predetermined method and injection-molding the pellets to/in a mold cavity having a mold surface of an arithmetic average roughness (Ra) of 0.03 μm. The arithmetic average roughness (Ra) is measured with a surface roughness meter.

(Photostabilizer)

The polycarbonate resin composition of the present invention may contain a hindered-amine-containing photostabilizer. Typical examples thereof include bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly{[6-(1,1,3,3-tetramethylbutyl)amino-1,3,5-triazin-2,4-diyl][(2,2,6,6-tetramethylpiperidyl)imino]-hexamethylene [(2,2,6,6-tetramethylpiperidyl)imino]} and polymethylpropyl 3-oxy-[[4-(2,2,6,6-tetramethyl)piperidinyl]siloxane. The photostabilizer may have a structure of a radical-polymerizable monomer compound and hence may be a polymer type ultraviolet absorbent and/or photostabilizer in which such a photostabilizer monomer and a monomer such as alkyl (meth)acrylate are copolymerized. The above photostabilizer monomer preferably includes, for example, a compound having a structure in which a hindered amine skeleton is contained in an ester substituent of a (meth) acrylic acid ester. The above polymer type photostabilizer may be a copolymer from a comonomer containing the above ultraviolet absorbent monomer.

When used in combination, the hindered-amine-containing photostabilizer and the benzotriazole-containing and/or triazine-containing ultraviolet absorbent(s) effectively improve the weatherability. The amount ratio of these two compounds (photostabilizer/ultraviolet absorbent) is preferably in the range of 95/5 to 5/95, more preferably in the range of 80/20 to 20/80 (in the case of the polymer type, the above is a weight ratio of monomers).

The above photostabilizers may be used alone, or a mixture of two or more members of them may be used. The amount of the photostabilizer per 100 parts by weight of the polycarbonate resin is preferably 0.0005 to 3 parts by weight, more preferably 0.01 to 2 parts by weight, still more preferably 0.02 to 1 part by weight, particularly preferably 0.05 to 0.5 part by weight.

(Bluing Agent)

The polycarbonate resin composition of the present invention preferably further contains 0.05 to 3 ppm (wight ratio), based on the polycarbonate resin, of a bluing agent. The bluing agent is effective for deleting the yellowish tint of a molded article of the polycarbonate resin. In reality, a molded article imparted with weatherability contains a predetermined amount of the ultraviolet absorbent, so that a resin product is liable to take on a yellowish tint due to the "function and color of the ultraviolet absorbent". The use of the bluing agent is therefore very effective for imparting a molded article with the appearance of natural transparency.

The above bluing agent refers to a colorant that exhibits a color in blue or purple by absorbing light of orange-and-yellow colors, and a dye is particularly preferred. When the bluing agent is incorporated, the polycarbonate resin composition of the present invention exhibits a further excellent hue. The amount of the bluing agent based on the resin composition is preferably in the range of 0.5 to 2.5 ppm, more preferably 0.5 to 2 ppm.

Typical examples of the bluing agent include Macrolex Violet B and Macrolex Blue RR supplied by Bayer AG, Telazol Blue RLS supplied by Sandoz AG, and Plast Blue 8580 supplied by Arimoto Chemical Co., Ltd.

(Dye and Pigment)

The polycarbonate resin composition of the present invention may contain various dyes and pigments in addition to the above bluing agent so long as the object of the present invention is not impaired. For maintaining transparency in particular, a dye is preferred. The dye preferably includes a perylene dye, a coumarin dye, a thioindigo dye, an anthraquinone dye, a thioxanthone dye, a ferrocyanide dye such as iron blue, a perinone dye, a quinoline dye, a quinacridone dye, a dioxazine dye, an isoindolinone dye and a phthalocyanine dye. The amount of the above dye per 100 parts by weight of Component A is preferably 0.0001 to 1 part by weight, more preferably 0.0005 to 0.5 part by weight.

(Antistatic Agent)

The polycarbonate resin composition of the present invention is sometimes required to have antistatic properties. In such a case, it is preferred to use an antistatic agent. Examples of the antistatic agent include (i) organic sulfonic acid phosphonium salts such as arylsulfonic acid phosphonium salt typified by dodecylbenzenesulfonic acid phosphonium salt and alkylsulfonic acid phosphonium salt. The amount of the above phosphonium salt per 100 parts by weight of Component A is properly 5 parts by weight or less, preferably in the range of 0.05 to 5 parts by weight, more preferably 1 to 3.5 parts by weight, and still more preferably 1.5 to 3 parts by weight.

Examples of the antistatic agent also include (ii) organic sulfonic acid alkali (alkaline earth) metal salts such as organic lithium sulfonate, organic sodium sulfonate, organic potassium sulfonate, organic cesium sulfonate, organic rubidium sulfonate, organic calcium sulfonate, organic magnesium sulfonate and organic barium sulfonate. Specific examples thereof include metal salts of dodecylbenzenesulfonic acid and metal salts of perfluoroalkanesulfonic acid. The amount of the organic sulfonic acid alkali (alkaline earth) metal salt per 100 parts by weight of Component A is properly 0.5 part by weight or less, preferably 0.001 to 0.3 part by weight, more preferably 0.005 to 0.2 part by weight. Particularly, salts of alkali metals such as potassium, cesium and rubidium are preferred.

Examples of the antistatic agent also include (iii) organic sulfonic acid ammonium salts such as alkylsulfonic acid ammonium salt and arylsulfonic acid ammonium salt. The amount of the ammonium salt per 100 parts by weight of Component A is properly 0.05 part by weight or less.

Examples of the antistatic agent also include (iv) a polymer containing, as its component, a poly(oxyalkylene) glycol component, such as polyether ester amide. The amount of the polymer per 100 parts by weight of Component A is properly 5 parts by weight or less.

Examples of other antistatic agent include (v) non-organic compounds such as carbon black, carbon fibers, carbon nanotubes, graphite, a metal powder and a metal oxide powder. The amount of the above non-organic compound per 100 parts by weight of Component A is properly 0.05 part by weight or less. These non-organic compounds included in the above (v) are sometimes used as a heat-absorbing agent in addition to the antistatic agent.

The polymer included in the above (iv) may contain, as a monomer component, a component in which a sulfonic acid salt group is substituted. Specific examples of the above polymer includes polymers containing, as their components, an aromatic dicarboxylic acid component and a poly(oxyalkylene)glycol component, in which an ester of an aromatic dicarboxylic acid substituted with a sulfonic acid salt group such as dimethyl 4-sodiumsulfo-isophthalate, dimethyl 5-sodiumsulfo-isophthalate, dimethyl 4-potassiumsulfo-isophthalate, dimethyl 5-potassiumsulfo-isophthalate, dimethyl 2-sodiumsulfo-terephthalate or dimethyl 2-potassiumsulfo-terephthalate is copolymerized. In the above polymers, the amount ratio of an aromatic dicarboxylic acid component non-substituted with a sulfonic acid salt group and an aromatic dicarboxylic acid component non-substituted with a sulfonic acid salt group is as follows When the total of these two components is 100 mol %, the content of the latter is preferably 5 to 50 molt, more preferably 8 to 35 molt, more preferably 10 to 30 mol %.

(Compound having Heat Absorption Capability)

The polycarbonate resin composition of the present invention may contain a compound having heat absorption capability, in such an amount that the object of the present invention is not impaired. Examples of the above compound preferably include a phthalocyanine-containing, near infrared absorbent and a carbon filler. As the above phthalocyanine-containing near infrared absorbent, for example, MIR-362 supplied by Mitsui Chemicals Inc. is easily commercially available. Examples of the carbon filler include carbon black, graphite (including natural and synthetic products and whiskers), a carbon fiber (including a product produced by a gaseous phase growth method), carbon nanotubes and fullerene, and carbon black and graphite are preferred. The above compounds may be used alone, or a mixture of two or more members of them may be used in combination. The amount of the phthalocyanine-containing near infrared absorbent per 100 parts by weight of the polycarbonate resin (Component A) is preferably 0.005 to 0.2 part by weight, more preferably 0.008 to 0.1 part by weight, still more preferably 0.01 to 0.07 part by weight. The amount of the carbon filler based on the resin composition of the present invention is preferably in the range of 0.1 to 200 ppm (weight ratio), more preferably in the range of 0.5 to 100 ppm, still more preferably in the range of 1 to 50 ppm.

(Flame Retardant)

The polycarbonate resin composition of the present invention may contain a flame retardant in such an amount that the object of the present invention is not impaired. The flame retardant includes a polycarbonate type flame retardant of halogenated bisphenol A, an organic-salt-containing flame retardant, an aromatic-phosphoric-ester-containing flame retardant and a halogenated aromatic phosphoric ester type flame retardant, and one or more of these can be used.

Specifically, the polycarbonate type flame retardant of halogenated bisphenol A includes a polycarbonate type flame retardant of tetrabromobisphenol A, a copolycarbonate type flame retardant from tetrabromobisphenol A and bisphenol A, and the like.

Specifically, the organic-salt-containing flame retardant includes dipotassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-dibromo-4-cumylphenyl) phosphate, sodium bis(4-cumylphenyl)phosphate, potassium bis(p-toluenesulfone)imide, potassium bis(diphenylphosphate)imide, potassium bis(2,4,6-tribromophenyl) phosphate, potassium bis(2,4-dibromophenyl)phosphate, potassium bis(4-bromophenyl)phosphate, potassium diphenylphosphate, sodium diphenylphosphate, potassium perfulorobutanesulfonate, sodium or potassium laurylsulfate and sodium or potassium hexadecylsulfate. The amount of the organic-salt-containing flame retardant per 100 parts by weight of Component A is preferably 0.0001 to 0.5 part by weight, more preferably 0.001 to 0.2 part by weight, still more preferably 0.003 to 0.15 part by weight.

Specifically, the halogenated aromatic phosphoric ester type flame retardant includes tris(2,4,6-tribromophenyl) phosphate, tris(2,4-dibromophenyl)phosphate and tris(4-bromophenyl)phosphate.

Specifically, the aromatic phosphoric ester type flame retardant includes triphenyl phosphate, tris(2,6-xylyl)phosphate, tetrakis(2,6-xylyl)resorcin diphosphate, tetrakis(2,6-xylyl)hydroquinone diphosphate, tetrakis(2,6-xylyl)-4,4'-biphenol diphosphate, tetraphenylresorcin diphosphate, tetraphenylhydroquinone diphosphate, tetraphenyl-4,4'-biphenol diphosphate, an aromatic polyphosphate using resorcin and phenol as an aromatic ring source and containing no phenolic OH group, an aromatic polyphosphate using resorcin and phenol as an aromatic ring source and containing a phenolic OH group, an aromatic polyphosphate using hydroquinone and phenol as an aromatic ring source and containing no phenolic OH group, a similar aromatic polyphosphate containing a phenolic OH group, ("aromatic polyphosphate" to be described hereinafter represents both an aromatic polyphosphate containing a phenolic OH group and an aromatic polyphosphate containing no phenolic OH group), an aromatic polyphosphate using bisphenol A and phenol as an aromatic ring source, an aromatic polyphosphate using tetrabromobisphenol A and phenol as an aromatic ring source, an aromatic polyphosphate using resorcin and 2,6-xylenol as an aromatic ring source, an aromatic polyphosphate using hydroquinone and 2,6-xylenol as an aromatic ring source, an aromatic polyphosphate using bisphenol A and 2,6-xylenol as an aromatic ring source, and an aromatic polyphosphate using tetrabromobisphenol A and 2,6-xylenol as an aromatic ring source. The amount of the halogenated aromatic phosphoric ester type flame retardant and the aromatic phosphoric ester type flame retardant per 100 parts by weight of Component A is preferably 0.1 to 25 parts by weight, more preferably 1 to 20 parts by weight, still more preferably 2 to 18 parts by weight.

(Other Resins and Elastomers)

The polycarbonate resin composition of the present invention gives a remarkably excellent molded article in the field where severe product qualities and transparency are required. Therefore, the most preferred embodiment of the polycarbonate resin composition of the present invention is a composition formed substantially from the polycarbonate resin. When other resin or elastomer is incorporated, however, the resin composition of the present invention also exhibits the excellent mold release property and the like which the resin composition has. The polycarbonate resin composition of the present invention can therefore contain them as required depending upon purposes.

Examples of the above "other" resin include polyester resins such as polyethylene terephthalate and polybutylene terephthalate, a polyamide resin, a polyimide resin, a polyether imide resin, a polyurethane resin, a silicone resin, a polyphenylene ether resin, a polyphenylene sulfide resin, a polysulfone resin, polyolefin resins such as polyethylene and polypropylene, a polystyrene resin, an acrylonitrile/styrene copolymer (AS resin), an acrylonitrile/butadiene/styrene copolymer (ABS resin), a polymethacrylate resin, a phenolic resin and an epoxy resin.

Examples of the elastomer include an isobutylene/isoprene rubber, a styrene/butadiene rubber, an ethylene/propylene rubber, an acrylic elastomer, a polyester-based elastomer, a polyamide-based elastomer, and core-shell type elastomers such as MBS (methyl methacrylate/styrene/butadiene) rubber and MAS (methyl methacrylate/acrylonitrile/styrene) rubber.

The amount of the "other" resin or elastomer per 100 parts by weight of the polycarbonate resin (Component A) is preferably 50 parts by weight or less, more preferably 40 parts by weight or less, still more preferably 30 parts by weight or less. When incorporated, the lower limit of the amount of the "other" resin or elastomer is preferably 1 part by weight or more.

(Other Additives)

The polycarbonate resin composition of the present invention may contain various inorganic fillers, flowability modifiers, antibacterial agents, photocatalyst antifoulants and photochromic agents as required depending upon purposes.

(Preparation of Polycarbonate Resin Composition)

For producing the polycarbonate resin composition of the present invention, any method can be employed. For example, Component A, Component B and arbitrary additives are fully mixed with a preliminary mixing means such as V blender, a Henschel mixer, a mechano-chemical apparatus or an extrusion mixer. Raw materials for each of the above components or a preliminary mixture can be granulated with an extrusion granulator or a briquetting machine. Then, there can be employed a method in which the above preliminary mixture is melt-kneaded with a melt-kneader typified by a vented twin-screw extruder, and the thus-prepared strands or the like are pelletized with a machine such as a pelletizer.

In addition, there can be also employed a method in which each component is independently fed into a melt-kneader typified by a vented twin-screw extruder or a method in which parts of the components are preliminarily mixed, and then fed to a melt-kneader independently of the remaining parts. As a method of preliminary mixing of parts of the components, there can be employed a method in which the fatty acid full ester as Component B of the present invention and other components are preliminarily mixed and then the resultant mixture is mixed with the polycarbonate resin or directly fed to an extruder.

As a preliminary mixing method, there can be also employed a method in which, when Component A is in the form of a powder, part of the powder and additives to be incorporated are blended, to prepare a master batch of the additives diluted with the powder. Further, there can be also employed a method in which individual components are independently fed somewhere in a melt extruder. When the components to be incorporated include a liquid component, a so-called liquid injecting device or a liquid adding device can be used for feeding such a component in a melt extruder.

As an extruder, there is preferably used an extruder having a vent capable of discharging water of the raw materials and volatile gases generated from a kneaded molten resin. It is preferred to provide a vacuum pump for effectively discharging generated water and volatile gases through the vent from the extruder. A screen for removing foreign matter included in raw materials to be extruded may be provided in a zone before an extruder die, so that the foreign matter can be removed from a resin composition. The above screen includes a wire mesh, a screen changer, a sintered metal plate (disc filter) and the like.

The melt-kneader includes a twin-screw extruder and others such as a Banbury mixer, a kneading roll, a single-screw extruder and a multi-screw extruder having 3 or more screws.

The thus-extruded resin is directly cut or pelletized (so-called hot-cut), or it is formed into strands and then the strands are cut with a pelletizer to pelletize them. When it is required to decrease the influence caused by external dust during the pelletization, it is preferred to purify an ambient atmosphere around the extruder.

While the thus-obtained pellets can have a general form such as a cylinder, a prism or a sphere, the pellets are preferably in the form of a cylinder. The diameter of the form of a cylinder is preferably 1 to 5 mm, more preferably 1.5 to 4 mm, still more preferably 2 to 3.3 mm. The length of the form of a cylinder is preferably 1 to 30 mm, more preferably 2 to 5 mm, still more preferably 2.5 to 3.5 mm.

Second Embodiment

Since the fatty acid full ester as Component B in the present invention contains the ester compound as a main component and the free aliphatic carboxylic acid as an auxiliary component as described already, the polycarbonate resin composition of the present invention can be also said to be a resin composition comprising these two compounds. From the above viewpoint, therefore, there is also provided the following second embodiment of the resin composition. That is, the second embodiment of the present invention is a polycarbonate resin composition comprising 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, the polycarbonate resin composition being a composition in which the molar ratio (Ff:Fe) of the molar amount (Ff) of carboxyl groups of free aliphatic carboxylic acid and the molar amount (Fe) of ester bonds of Component B is in the range of 8:92 to 30:70. The above resin composition is preferably in the form of pellets to be used for producing an end molded article.

(Ff:Fe)

The content ratio of the aliphatic full ester compound and the aliphatic carboxylic acid in the resin composition is calculated on the basis of $^1$H-NMR measurement of the resin composition. Since the content of the aliphatic carboxylic acid compound in the pellets is very small, it is required to conduct the above measurement with an NMR measuring apparatus having a frequency of 600 MHz or more. The molar ratio (Ff:Fe) of the molar amount (Ff) of carboxyl groups of the free aliphatic carboxylic acid and the molar amount (Fe) of ester bonds of the aliphatic carboxylic acid ester compound, calculated on the basis of the above measurement, is preferably in the range of 10:90 to 25:75, more preferably in the range of 12:88 to 22:78. For example, when the ester compound is a pentaerythritol ester, the above Ff:Fe can be calculated as follows. That is, hydrogen atoms of methylene groups bonded to carboxylic groups of the aliphatic carboxylic acid component (including a free acid compound and the ester compound) have a signal appearing at approximately 2.3 ppm. The peak area of this region is supposed to be Sc. Hydrogen atoms of methylene groups of the pentaerythritol component bonded to the ester bond have a signal appearing at approximately 4.1 ppm. The peak area of this region is supposed to be Se. On the basis of above data, the Ff:Fe ratio can be calculated from the relationship of Ff:Fe=(Sc/2-Se/2): (Se/2) (the Ff:Fe is converted such that the total of Ff and Fe amounts to 100).

In addition, the above molar ratio does not necessarily correspond to the molar ratio thereof in the fatty acid ester to be incorporated during the preparation of the pellets. That is presumably because the ester bonds of the fatty acid ester compound are decomposed under heat, etc., during the preparation of the pellets.

In the second embodiment of the present invention, the polycarbonate resin as Component A is the same as the counterpart in the first embodiment. The aliphatic polyhydric alcohol having 4 to 8 hydroxyl groups and 5 to 30 carbon atoms and the aliphatic carboxylic acid having 10 to 22 carbon atoms, for constituting Component B, are also the same as the counterparts in the first embodiment. Preferably, the aliphatic carboxylic acid for Component B contains a palmitic acid component and a stearic acid component, and in peak areas of a gas chromatography-mass spectrometry method (GC/MS method) thereof, the total of a palmitic acid component area (Sp) and a stearic acid component area (Ss) is at least 80% of the entire aliphatic carboxylic acid component area, and the area ratio (Ss/Sp) of these two components is from 1.3 to 30. The method of measuring the area ratio (Ss/Sp) is as described already.

Further, those optional components such as Components C to E described in the first embodiment may be incorporated as well.

Third Embodiment

The polycarbonate resin composition of the present invention gives pellets suitable for a transparent member for an automobile by accomplishing the object of the present invention on the basis of the above embodiment. According to the present invention, therefore, there is provided the following second embodiment of the resin composition. That is, the third embodiment of the present invention is directed to pellets formed of a resin composition comprising 100 parts by weight of a polycarbonate resin (Component A) and 0.005 to 2 parts by weight of a full ester (Component B) from an aliphatic polyhydric alcohol having 4 to 8 hydroxyl groups and 5 to 30 carbon atoms and an aliphatic carboxylic acid having 10 to 22 carbon atoms, wherein said pellets satisfy the requirement that the mold release load of said pellets in a mold release load measurement method is 85% or less of the mold release load, measured by said measurement method, of pellets formed from a resin composition containing said Component A and pentaerythritol tetrastearate which has an acid value of 0.8, has a 5% weight loss temperature, measured by TGA (thermogravimetric analysis), of 396° C., and is incorporated in an amount equivalent to the amount of said Component B.

(Method of Measuring Mold Release Load)

In the measurement of a mold release load, a cup-shaped molded article shown in FIG. 1 is prepared from pellets, and a load required for releasing the cup from a mold by ejection is measured. In the measurement of the mold release load, a load cell is set in an ejection plate, a measurement is made for a pressure being exerted on the load cell when the cup-shaped molded article is ejected, and a maximum value is taken as a mold release load. The molding of the cup-shaped molded article is carried out forty shots in series, and after the mold release load is stabilized, the molding was continuously carried out thirty shots. An average value of mold release loads of the thirty shots is taken as a mold release load (N).

A mold cavity corresponding to the inner surface side of the cup-shaped molded article (mold cavity wall on a movable mold member side) had an arithmetic average roughness (Ra) of 0.03 μm.

In the measurement of a mold release load, a molded article obtained from comparative pellets formed of a standard resin composition is measured for a mold release load, and a ratio of the mold release load of each sample to the mold release load of the above molded article is calculated. The standard value is a mold release load of a resin composition (SRC-I) obtained by mixing 100 parts by weight of a polycarbonate resin with 0.2 part by weight of pentaerythritol tetrastearate having an acid value of 0.8 and a 5% weight loss temperature, measured by TGA (thermogravimetric analysis), of 396° C., or a resin composition (SRC-II) obtained by mixing 100 parts by weight of a polycarbonate resin with 0.5 part by weight of the above pentaerythritol tetrastearate.

The mold release load based on the standard value is 85% or less, preferably 80% or less.

Preferably, the molar ratio (Ff:Fe) of the molar amount (Ff) of carboxyl groups of free aliphatic carboxylic acid in said pellets and the molar amount (Fe) of ester bonds of Component B is in the range of 10:90 to 30:70 like the first or second embodiment. The method of measuring Ff and Fe is as explained already.

The aliphatic polyhydric alcohol is preferably pentaerythritol. Preferably, the aliphatic carboxylic acid for Component B contains a palmitic acid component and a stearic acid component, and in peak areas of a gas chromatography-mass spectrometry method (GC/MS method) thereof, the total of a palmitic acid component area (Sp) and a stearic acid component area (Ss) is at least 80% of the entire aliphatic carboxylic acid component area, and the area ratio (Ss/Sp) of these two components is from 1.3 to 30. The method of measuring the area ratio (Ss/Sp) is as described already.

Preferably, the above pellets show a haze value in the range of 0.1 to 1% as a 2 mm thick smooth flat plate prepared therefrom having an arithmetic average roughness (Ra) of 0.03 μm, and substantially contain no filler. The method of measuring a haze value is as described already.

The pellets most preferably have the form of a cylinder having a diameter of 2 to 3.3 mm and a length of 2.5 to 3.5 mm each.

In the third embodiment of the present invention, the polycarbonate resin as Component A is the same as that in the first embodiment. The aliphatic polyhydric alcohol having 4 to 8 hydroxyl groups and 5 to 30 carbon atoms and the aliphatic carboxylic acid having 10 to 22 carbon atoms for constituting Component B are the same as those in the first embodiment. The third embodiment of the present invention may contain such optional components exemplified by Components C to E as those in the first embodiment.

Fourth Embodiment

The fourth embodiment of the present invention is a molded article formed of the polycarbonate resin composition according to the first or second embodiment of the present invention. This embodiment also includes a molded article formed from the pellets according to the third embodiment.

Generally, the molded article can be obtained by injection-molding pellets. The injection molding includes not only a general molding method but also others such as injection compression molding, injection press molding, gas-assisted injection molding, insert molding, in-mold coating molding, insulated rubber molding, rapid heating cooling molding, two-color molding and sandwich molding and ultra-high speed injection molding. The molding can employ any one of a cold runner method and a hot runner method.

According to the present invention, further, the polycarbonate resin composition can be extrusion-molded to obtain a molded article in the form of any one of various profiles, a sheet, a film or the like. For forming a sheet or film, there may be employed an inflation method, a calender method or a casting method. Further, the polycarbonate resin composition can be formed into a heat-shrinkable tube by applying a specific stretching operation. Further, the polycarbonate resin composition of the present invention can be formed into a hollow molded article by rotational molding or blow molding.

(Surface Treatment)

The molded article of the present invention can be subjected to various surface treatments. The surface treatment includes various surface treatments such as hard coating, water-repellent or oil-repellent coating, hydrophilic coating, antistatic coating, ultraviolet-absorbing coating, infrared-absorbing coating and metallizing (vapor deposition). In addition to a method of coating with a solution, the surface treatment method includes a vapor deposition method, a spray coating method and a plating method. As vapor deposition method, any one of a physical vapor deposition method and a chemical vapor deposition method can be employed. Examples of the physical vapor deposition method include a vacuum vapor deposition method, a sputtering method and an ion plating method. Examples of the chemical vapor deposition (CVD) method include a hot CVD method, a plasma CVD method and a photo CVD method.

Being improved in cracking resistance, the molded article of the present invention is remarkably suitable for carrying out the above surface treatment. The polycarbonate resin composition of the present invention is suitable particularly for surface treatment including a factor, such as a solvent, which has an adversary effect on a polycarbonate resin, and it is particularly suitable for hard coating.

The hard coating agent for use in the present invention includes, for example, a silicone-resin-based hard coating agent and an organic-resin-based hard coating agent. The silicone-resin-based hard coating agent is used for forming a cured resin layer having siloxane bonds. It includes a partial hydrolysis condensate of a compound containing, as a main component, a compound corresponding to a trifunctional siloxane unit (such as a trialkoxysilane compound, or the like). Preferably, it includes a partial hydrolysis condensate which further contains a compound corresponding to a tetrafunctional siloxane unit (tetraalkoxysilane, or the like), and a partial hydrolysis condensate obtained by adding metal oxide fine particles such as colloidal silica to the above condensate. The silicone-resin-based hard coating agent may further contain a difunctional siloxane unit and a monofunctional siloxane unit. The hard coating agent contains an alcohol generated during a condensation reaction (in the case of a partial hydrolysis condensate of an alkoxysilane), and may be dissolved or dispersed in any organic solvent, water or a mixture of these as required. The above organic solvent includes lower fatty acid alcohols, and polyhydric alcohols and ethers and esters thereof. The hard coating layer may contain various surfactants for obtaining a smooth surface state, such as a siloxane-containing surfactant and an alkyl-fluoride-containing surfactant.

Examples of the organic-resin-based hard coating agent include a melamine resin, a urethane resin, an alkyd resin, an acrylic resin and a polyfunctional acrylic resin. The above polyfunctional acrylic resin includes resins such as polyol acrylate, polyester acrylate, urethane acrylate, epoxy acrylate and phosphazene acrylate.

Of the above hard coating agents, preferred is a silicone-resin-based hard coating agent having excellent durability performance for a long period of time and having relatively high surface hardness or an ultraviolet-ray-curable acrylic or polyfunctional acrylic resin that is relatively easy in handling and which gives an excellent hard coating layer. The silicone-resin-based hard coating agent can be selected from a so-called two-coat type agent that is to constitute a primer layer and a top layer and a one-coat type agent that is to form one layer alone.

The resin for the above primer layer (first layer) includes various urethane resins constituted of a block isocyanate component and a polyol component, an acrylic resin, a polyester resin, an epoxy resin, a melamine resin, an amino resin, and various polyfunctional acrylic resins such as polyester acrylate, urethane acrylate, epoxy acrylate, phosphazene acrylate, melamine acrylate and amino acrylate. These resins may be used alone or a combination of two or more members of them may be used. Of these, a resin containing preferably at least 50% by weight, more preferably at least 60% by weight, of a polyfunctional acrylic resin is preferred, and a resin containing an acrylic resin and urethane acrylate is particularly preferred. These resins may be used in any one of a method in which a resin in an unreacted state is applied and then allowed to react in a predetermined reaction to form a cured resin and a method in which a reacted resin is directly applied to form a cured resin layer. In the latter method, generally, the resin is dissolved in a solvent to form a solution and then the solution is applied, followed by removal of the solvent. In the former method, generally, a solvent is used.

Further, the resin (for) forming the hard coating layer may contain the above photostabilizer and ultraviolet absorbent, and may also contain various additives or additive auxiliaries such as a catalyst, a heat- or photo-polymerization initiator, a polymerization inhibitor, a silicone anti-foamer, a leveling agent, a thickener, a precipitation inhibitor, a sagging inhibitor, a flame retardant and an organic or inorganic pigment or dye.

The coating method can be selected from a bar coating method, a dip coating method, a flow coating method, a spray coating method, a spin coating method, a roll coating method, or the like as required depending upon the form of a molded article that constitutes a substrate to be coated. Of these, a dip coating method, a flow coating method and a spray coating method which are easily applicable to molded articles having complicated forms are preferred.

EXAMPLES

The present invention will be explained further with reference to Examples hereinafter. Evaluations are made according to the following methods.

(I) Method of Evaluation of Fatty Acid Full Ester

Fatty acid esters (B-1 to B-8) used as raw materials for compositions were evaluated for the following (1) to (3). Table 1 shows the evaluation results.

(1) Acid Value of Fatty Acid Full Ester

An acid value (KOHmg/g) was determined by a neutralization titration method according to JIS K 0070.

(2) 5% Weight Loss Temperature of Fatty Acid Full Ester by Thermogravimetry

With an Hi-Res TGA2950 thermogravimetric analyzer supplied by TA-Instruments, a sample was temperature-increased at a rate of 20° C./minute in an $N_2$ atmosphere, and a temperature at which the weight loss of the sample came to be 5% by weight of the charged weight thereof was measured as a TGA 5% weight loss temperature.

(3) GC/MS Measurement Area Ratio of Aliphatic Carboxylic Acid Component (Ss/Sp)

The measurement of an aliphatic carboxylic acid component of a fatty acid ester by a pyrolysis methylation CG/MS method is carried out by the following procedures.

As a GC/MS apparatus, a GC:HP6890 model and MS:HP5973 model (both supplied by Hewlett-Packard) which were connected were used, and as a pyrolyzer apparatus, JHP-3 (Nippon Bunseki Kogyo) was used.

A solution of a sample in chloroform was weighed, and approximately 20 μg of the sample was weighed and received on a pyrofoil for the pyrolyzer apparatus ("F358" for 358° C., supplied by Nippon Bunseki Kogyo) by a method of removing the chloroform. Further, 10 μl of a 2.5 wt % methanol solution of tetramethylammonium hydroxide (TMAH) as a reagent was added to the above sample, and the mixture was heated to approximately 60° C. to remove the solvent. Then, the sample was pyrolyzed under conditions of 358° C. and 10 seconds with the above pyrolyzer apparatus.

Conditions of the GC/MS measurement were as follows. As a column, a capillary column, DB-5MS (30 m×0.25 mm×0.25 μm, supplied by J&W) was used, and as a carrier gas, helium gas was used. The carrier gas had a constant value of 72.4 KPa (10.5 psi) under a constant-pressure mode, and the (initial) gas flow rate at 40° C. was set at 1.3 ml/minute. Further, the split ratio was set at 50/1, the inlet temperature was set at 300° C., and the temperature of the GC/MS connection portion was set at 280° C. In a column vessel temperature condition, the column vessel was maintained at 40° C. for 5 minutes, then temperature-increased up to 320° C. at a temperature elevation rate of 20° C./minute, and further maintained at 320° C. for 5 minutes to carry out the measurement. As an ionization mode, the MS apparatus used an electron impact ionization (EI) mode, and the measurement was conducted in the mass/charge number (m/z) range of from 20 to 500. The number of times of scanning per second was set at approximately 3. Further, the ion acceleration voltage, etc., were set by auto-tuning using a standard sample of PFTBA. On the basis of the above measurements, the ratio of the total of Ss and Sp in the entire aliphatic carboxylic acid component and the area ratio (Ss/Sp) thereof were calculated.

(II) Method of Evaluation of Resin Composition

Produced resin compositions were evaluated for the following (4) to (12) by methods described below.

(4) $^1$H-NMR Measurement (Ff:Fe)

A sample (35 mg) was weighed from pellets prepared in each of Examples to be described later, and each sample was dissolved in 0.5 ml of heavy bichloroform. The thus-prepared solutions were placed in ampoule tubes to obtain samples for $^1$H-NMR measurement. Each of the above samples for the measurement was measured for $^1$H-NMR with a 600 MHz-frequency NMR measuring apparatus (JNM-alpha600, supplied by JEOL Ltd.). Concerning measurement conditions with regard to each sample, the number of times of integration was 2,048, and the measurement time period was approximately 4 hours.

On the basis of the above measurement, Ff:Fe was calculated as follows. That is, the signals of hydrogen atoms of methylene groups bonded to carboxyl groups of an aliphatic carboxylic acid component (including both an acid and an ester) appear at approximately 2.3 ppm. The peak area in this region was taken as Sc. Signals of hydrogen atoms of methylene groups in a pentaerythritol component bonded to ester bonds appear at approximately 4.1 ppm. The peak area in this region was taken as Se. On the basis of the above data, Ff:Fe was calculated from the relationship of Ff:Fe=(Sc/2−Se/2): (Se/2) (Ff:Fe was converted such that the total of Ff and Fe amounts to 100).

(5) Transparency of Molded Article

A 2.0 mm thick molded plate (50×50 mm square plate) was measured for a whole light transmissivity and a haze with a haze meter NDH-300A supplied by Nippon Denshoku K.K. The above molded plate was prepared by a method in which pellets prepared by a method to be described later were dried according to a predetermined method and injection-molded in a mold cavity constituted of a mold surface having an arithmetic average roughness (Ra) of 0.03 μm, and a surface roughness tester was used to confirm that the thus-obtained molded article had an Ra of 0.03 μm. The whole light transmissivity means that with an increase in the value thereof, a molded article has higher transparency. Further, the haze refers to a haziness of a molded article and means that with a decrease in the value thereof, the molded article has less haze.

(6) Measurement of Durability Against Molding Heat

Square plates having a thickness of 2 mm and a size of 50×50 mm were molded with an injection molding machine having a maximum clamping force of 1,470 kN (T-150D, supplied by Fanuc Ltd.) using the same mold as that in the above (5) at a cylinder temperature of 340° C. and a mold temperature of 80° C. at an injection cycle of 60 seconds. A difference between the hue of the above square plate and the hue of a molded article formed after 10 minutes' residence in a cylinder at a temperature of 340° C. was determined on the basis of the following expression and shown as ΔE.

$$\Delta E = ((L-L')^2 + (a-a')^2 + (b-b')^2)^{1/2}$$

wherein (L, a, b) show hues before the residence and (L', a', b') show hues after the residence.

(7) Measurement of Mold Release Property

A measurement was made for a mold release load when a cup-shaped molded article as shown in FIG. 1 was released from a mold by ejection. The above measurement for a mold release load was made by providing a load cell (CMM1-500K, supplied by Minebea Co., Ltd.) in an ejection plate and using a mold having a constitution in which the top end portion of the load cell ejected an ejection pin. In the above constitution, forces being exerted on the load cell were measured during the ejection, and a maximum value thereof was determined to be a mold release load. Cup-shaped molded articles described above were molded continuously to 40 shots, then, mold release loads were stabilized, the molding was continuously carried out 30 shots, and an average value of the 30 shots was taken as a mold release load (N). The mold cavity wall (cavity wall formed of a movable mold member) corresponding to an inner surface side of each cup-shaped molded article had an arithmetic average roughness (Ra) of 0.03 μm. The molding conditions of the cup-shaped molded articles were as follows. That is, a molding machine: SS75t supplied by Sumitomo Heavy Industries, Ltd., cylinder temperature: 300° C., mold temperature: 80° C., a filling time period: 10 seconds, dwelling pressure application: 118 MPa, time period of dwelling pressure application: 15 seconds, cooling time period: 20 seconds. Excellent molded articles were obtained under the above conditions.

In the above mold release load measurement, a standard resin composition for comparison was measured for a mold release load, and a relative ratio of the mold release load of each sample was calculated and shown in Table. As the above standard resin composition for comparison, there were prepared a resin composition (SRC-1) containing 100 parts by weight of PC and 0.2 part by weight of pentaerythritol tetrastearate B-8 to be described later and a resin composition (SRC-II) containing 100 parts by weight of PC and 0.5 part by weight of the same pentaerythritol tetrastearate as above. The above SRC-I and SRC-II were prepared under the same conditions as those for preparing the resin composition of Example 1. SRC-I showed a mold release load of 2,320 N, and SRC-II showed a mold release load of 1,600 N.

(8) Silver Streaks of Molded Article

The cup-shaped molded articles formed by the 30-shot continuous molding for the mold release load measurement in the above (7) were observed for silver streaks. Table shows the number of molded articles having silver streaks out of 30 molded articles.

(9) Observation of Strain (Strain-1) of Molded Article

The square plates prepared in the test for the above durability against molding heat were visually observed through a polarizing plate for a strain state. In the above observation, the strain was evaluated for its degree on the basis of a color change in a fringe pattern caused by observation through the polarizing plate and the non-uniformity of denseness and sparseness thereof.

X: A number of fringe patterns were observed in the flow direction, the fringe patterns are dense, and each boundary between colors is clear.

Δ: The number of fringe patterns is small as compared with the above X, and each boundary between colors is unclear. However, a dense fringe pattern portion remains in a circumferential portion.

○: The number of fringe patterns is far smaller than that in the above Δ, the fringe patterns are sparse, and each boundary between colors is unclear.

(10) Observation of Strain (Strain-2) of Molded Article

Figure 2:
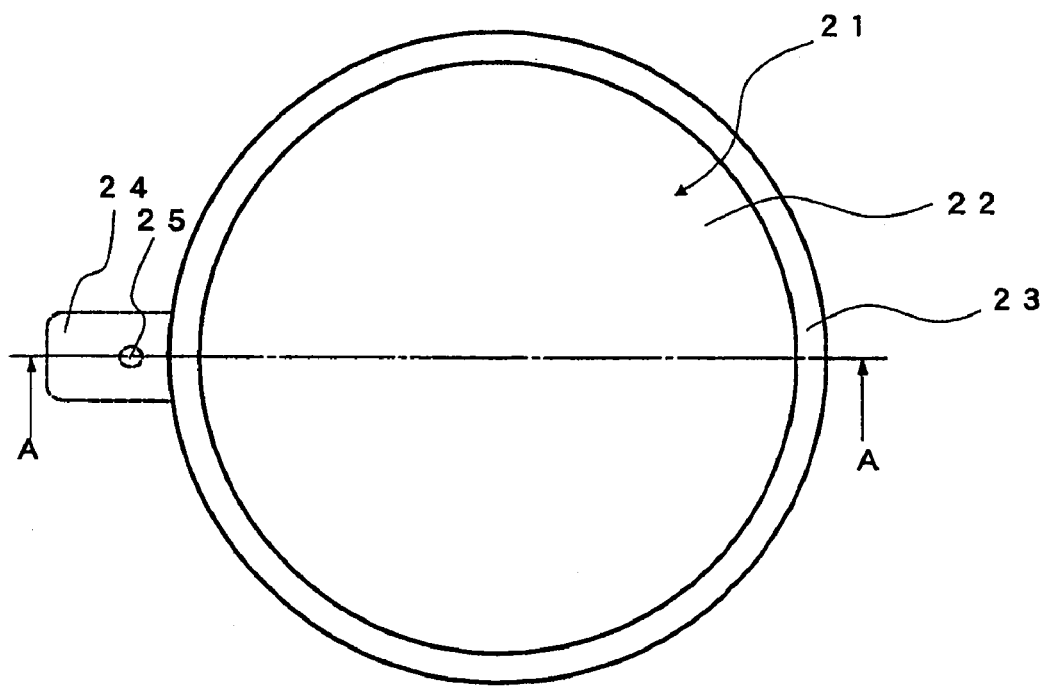
FIG. 2 is a schematic drawing of automobile transparent headlamp lenses prepared in Examples. [2-A] is a front view thereof (a drawing of projection to a platen surface during molding. The thus-obtained area is hence a maximum projection area). [2-B] is a cross-section view taken along A-A line thereof (said lenses are dome-shaped lenses).
Figure 2:
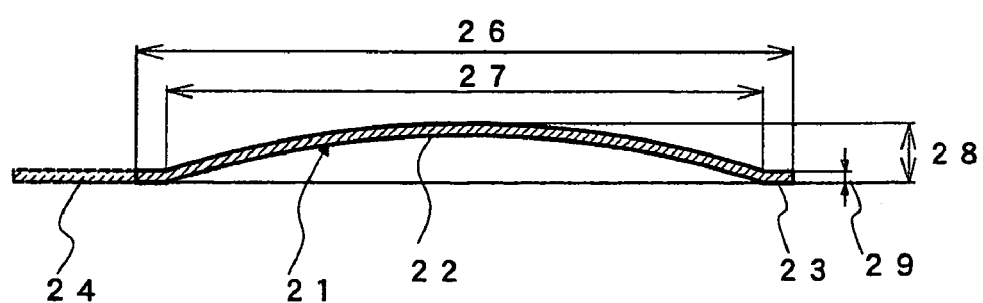

Transparent headlamp lenses shown in FIG. 2 were molded thirty shots with an injection molding machine (SG260M-HP, supplied by Sumitomo Heavy Industries, Ltd.) at a cylinder temperature of 320° C. at a mold temperature of 80° C. and annealed at 120° C. for 2 hours. Then, each of the above molded articles was placed between two polarizing plates having planes of polarization crossing each other at right angles and observed for a shade (strain-2). Thirty molded articles were observed, and the degree of the shade was evaluated on the basis of the following standard.

○: A shade has a relatively low contrast and is slightly observable.

Δ: A shade has a high contrast to some extent and is clearly observable.

X: A shade has a high contrast and is greatly clearly observable over a large area.

(11) Stress Cracking Test (11-1) Cracking During Molding

Cup-shaped molded articles were continuously molded 1,000 shots under the same conditions as those in the measurement of the mold release property. X shows that cracking took place, and ○ shows no cracking took place.

(11-2) Cracking After Hard Coating Treatment

One hundred cup-shaped molded articles that underwent no cracking in the above (11-1) were hard-coated with a hard coating agent shown in Examples. X shows that cracking took place, and ○ shows no cracking took place.

(12) Weathering Test

A square plate having a thickness of 2 mm and a size of 50×50 mm was molded with an injection molding machine having a maximum clamping force of 1,470 kN at a cylinder temperature of 340° C. and a mold temperature of 80° C. at an injection cycle of 60 seconds. The above square plate was treated with a sunshine weather meter (WEL-SUN: HC-B, supplied by Suga Test Instruments Co., Ltd.) at a black panel temperature of 63° C., at a humidity of 50% in a 120 minutes' cycle consisting of a water-spraying time period of 18 minutes and a no-spray time period of 102 minutes for 1,000 hours, and a hue change ΔYI value was calculated from the following expression.

ΔYI=YI value of square plate after the test −YI value of the square plate before the test Examples 1 to 11 and Comparative Examples 1 to 9

An ester compound (Component B) from a polyhydric alcohol and an aliphatic carboxylic acid and other additives (Components C to E) shown in Tables 2 to 5 in amounts shown in Tables 2 to 5 were added to 100 parts by weight of a polycarbonate resin (PC) prepared from bisphenol A and phosgene by an interfacial polycondensation method, 0.0002 part by weight of a bluing agent (Macrolex Violet B, supplied by Bayer AG) was further added, and these components were mixed with a blender. Then, the mixture was melt-kneaded with a vented twin-screw extruder to give pellets. Each of the additives to be added to the polycarbonate resin was mixed with part of the polycarbonate resin to prepare preliminary mixtures so that the concentration of each additive therein was 10 to 100 times the concentration of the amount of each additive in the resultant composition. Then, the entire composition was mixed with a blender. As a vented twin-screw extruder, there was used TEX30α (complete intermeshing, rotations in the same direction, double flighted screws) supplied by Japan Steel Works, Ltd. The twin-screw extruder had one kneading zone before a vent. The extrusion conditions included an output amount of 20 kg/h, a screw revolution speed of 150 rpm, a vent vacuum degree of 3 kPa, the extrusion temperature was set 280° C. from a first feed port to a die, and the pellets were accordingly obtained.

The thus-obtained pellets were dried with a hot air circulation type dryer at 120° C. for 5 hours, and then injection-molded with an injection molding machine at a cylinder temperature of 340° C. at a mold temperature of 80° C., to form a 2 mm thick square plate having a size of 50×50 mm. As an injection molding machine, there was used T-150D supplied by Fanuc Ltd.

Pellets obtained in each Example were similarly dried and injection-molded with an injection molding machine (SG260M-HP, supplied by Sumitomo Heavy Industries, Ltd.) at a cylinder temperature of 320° C. at a mold temperature of 80° C., to form transparent headlamp lenses as shown in FIG. 2. The headlamp lenses obtained from the resin compositions in Examples were excellent in appearances such as hue and transparency.

Further, the above-obtained pellets were similarly dried and used for measuring mold release loads.

After the above-obtained headlamp lenses in Examples were annealed at 120° C. for 2 hours (after completion of the above evaluation (10)), a coating composition (i-1) shown below was applied by a dip coating method, the thus-coated headlamp lenses were allowed to stand at 25° C. for 20 minutes, and the coating composition was thermally cured at 120° C. for 30 minutes. Then, a coating composition (ii-1) shown below was further applied to the above lens molded articles by a dip coating method, the coated lens molded articles were allowed to stand at 25° C. for 20 minutes, and then the coating composition was thermally cured at 0.120° C. for 2 hours to carry out hard coating treatment. The thus-obtained headlamp lenses were observed to show no cracking.

Components indicated by symbols in Tables 1 to 5 are as follows.

(Component A)

PC: A polycarbonate resin powder having a viscosity average molecular weight of 22,500, produced from bisphenol A and phosgene by an interfacial polycondensation method (Panlite L-1225WP, supplied by Teijin Chemicals Ltd.)

(Component B)

B-1: A full ester from pentaerythritol and an aliphatic carboxylic acid (containing stearic acid and palmitic acid as main components), having an acid value of 9 and a TGA 5% weight loss temperature of 322° C., in which the total of a stearic acid component area (Ss) and a palmitic acid component area (Sp) was 94% of the entire aliphatic carboxylic acid component and the area ratio (Ss/Sp) by GC/MS method was 1.44 (Rikester EW-400, supplied by Riken Vitamin Co., Ltd., hydroxyl value: 6, iodine value: 0.4, the aliphatic carboxylic acid being obtained from an animal fat as a raw material).

B-3 (Comparative): Full ester from pentaerythritol and an aliphatic carboxylic acid (containing stearic acid and palmitic acid as main components), having an acid value of 1 and a TGA 5% weight loss temperature of 390° C., in which the total of Ss and Sp was 91% of the entire aliphatic carboxylic acid component and the area ratio (Ss/Sp) was 1.11 (Loxiol VPG-861, supplied by Cognis Japan, hydroxyl value: 7, iodine value: 0, the aliphatic carboxylic acid being obtained from a plant oil as a raw material).

B-6 (Comparative): A full ester from pentaerythritol and an aliphatic carboxylic acid (containing stearic acid and palmitic acid as main components), having an acid value of 2 and a TGA 5% weight loss temperature of 378° C., in which the total of a stearic acid component area (Ss) and a palmitic acid component area (Sp) was 90% of the entire aliphatic carboxylic acid component area and the area ratio (Ss/Sp) was 1.07 (Rikester EW-440A, supplied by Riken Vitamin Co., Ltd., hydroxyl value: 12, iodine value: 0.4, the aliphatic carboxylic acid being obtained from a plant oil as a raw material).

B-7 (Comparative): Glycerin monofatty acid ester (Rikemal S-100A, supplied by Riken Vitamin Co., Ltd., acid value: 0.8, hydroxyl value: 327, iodine value: 1.8, TGA 5% weight loss temperature: 205° C.)

B-2, B-4 and B-5 (Comparative): A commercially available fatty acid full ester and an aliphatic carboxylic acid as a reagent were mixed in a compositional amount ratio shown in Table 1, to prepare a fatty acid ester having an acid value and a weight loss temperature which were adjusted. In the preparation, the fatty acid ester was weighed in a predetermined amount and received in a beaker, heated to 80° C. to dissolve it, a predetermined amount of stearic acid (special grade reagent, supplied by Wako Pure Chemical Industries, Ltd.) and a predetermined amount of palmitic acid (special grade reagent, supplied by Wako Pure Chemical Industries, Ltd.) were added, and these components were homogeneously mixed with an electric blender (supplied by Braun). Table 1 shows results of evaluations of the above-prepared fatty acid full esters for evaluation items (1) to (3).

B-8 (Comparative): Pentaerythritol tetrastearate obtained by reacting pentaerythritol and stearic acid that was the above reagent. Table 1 shows results of evaluations of this fatty acid full ester for evaluation items (1) to (3).

(Additives as Component C)

C1-1: Phosphonite-based heat stabilizer (Sandostab P-EPQ, supplied by Sandoz)

C1-2: Phosphite-based heat stabilizer (Irgafos 168, supplied by Ciba Specialty Chemicals)

C2-1: Hindered-phenol-based antioxidant (Irganox 1076, supplied by Ciba Specialty Chemicals)

(Additives as Component D)

D-1: Benzotriazole-based ultraviolet absorbent (Chemisorb 79, supplied by Chemipro Chemicals Co., Ltd.)

D-2: Hydroxyphenyl triazine-based ultraviolet absorbent (Tinuvin 1577, supplied by Ciba Specialty Chemicals)

D-3: Cyclic-iminoester-based ultraviolet absorbent (2,2'-p-phenylenebis(3,1-benzooxadin-4-one), CEi-P, supplied by Takemoto Oil & Fat Co., Ltd.)

(Additive as Component E)

E-1: Coumarin-based fluorescent brightener (Hakkol PSR, supplied by Hakkol Chemical Co., Ltd.)

(Hard-Coating Composition)

(1) Coating Composition (i-1)

A flask having a reflux condenser and a stirrer and having had an atmosphere replaced with nitrogen was charged with 70 parts of methyl methacrylate (to be abbreviated as "MMA" hereinafter), 39 parts of 2-hydroxyethyl methacrylate (to be abbreviated as "HEMA" hereinafter), 0.18 part of azobisisobutyronitrile (to be abbreviated as "AIBN" hereinafter) and 200 parts of 1,2-dimethoxyethane, and these components were mixed and dissolved. Then, the mixture was allowed to react with stirring under nitrogen gas current at 70° C. for 6 hours. The resultant reaction solution was added to n-hexane to form a precipitate for purification, whereby 90 parts of a copolymer (acrylic resin (I)) having an MMA/HEMA compositional ratio of 70/30 (molar ratio) was obtained. The above copolymer had a weight average molecular weight, as polystyrene, of 80,000 on the basis of GPC measurement (column: Shodex GPCA-804, eluant: THF).

For a composition for a hard coating first layer, then, 8 parts of the above acrylic resin (I) was dissolved in a mixture solvent containing 40 parts of methyl ethyl ketone, 20 parts of methyl isobutyl ketone, 5.2 parts of ethanol, 14 parts of isopropanol and 10 parts of 2-ethoxyethanol, and then 10 parts of methyltrimethoxysilane hydrolysis condensate solution (X) was added. The resultant solution was stirred at 25° C. for 5 minutes, 1 part of a melamine resin (Cymel 303,

TABLE 1

| | Fatty acid ester | | Aliphatic carboxylic acid (part by weight) | | | 5% weight loss | | Ratio of total of |
|---|---|---|---|---|---|---|---|---|
| Symbol | Kind | Part by weight | Palmitic acid | Stearic acid | Acid value (KOHmg/g) | temperature (° C.) | Ss/Sp (—) | Ss and Sp (%) |
| B-1 | Rikester EW-400 | 100 | — | — | 9.0 | 322 | 1.44 | 94 |
| B-2 | Rikester EW-400 | 95 | 1.25 | 3.75 | 15.6 | 278 | 1.47 | 94 |
| B-3 | Loxyol VPG-861 | 100 | — | — | 1.0 | 390 | 1.11 | 91 |
| B-4 | Loxyol VPG-861 | 95 | 2.5 | 2.5 | 10.7 | 317 | 1.09 | 91 |
| B-5 | Loxyol VPG-861 | 85 | 7.5 | 7.5 | 32.1 | 244 | 1.09 | 92 |
| B-6 | RikesterEW-440A | 100 | — | — | 2.0 | 378 | 1.07 | 90 |
| B-7 | Rikemal S-100A | 100 | — | — | 0.8 | 205 | — | — |
| B-8 | Pentaerythritol tetrastearate | 100 | — | — | 0.8 | 396 | (Sp = 0) | 100 | supplied by Mitsui Cytec, Ltd.) was added, and the mixture was stirred at 25° C. for 5 minutes to give a coating composition (i-1).

(2) Coating Composition (ii-1)

The same apparatus as that used above was charged with 142 parts of methyltrimethoxysilane, 72 parts of distilled water and 20 parts of acetic acid, and these components were mixed with cooling with ice water. The mixture was stirred at 25° C. for 1 hour and diluted with 116 parts of isopropanol, to give 350 parts of a methyltrimethoxysilane hydrolysis condensate solution (X). On the other hand, 208 parts of tetraethoxysilane and 81 parts of 0.01 N hydrochloric acid were mixed with cooling with ice water, and the mixture was stirred at 25° C. for 3 hours and diluted with 11 parts of isopropanol, to give 300 parts of a tetraethoxysilane hydrolysis condensate (Y).

For a composition for a hard coating second layer, 12 parts of distilled water and 20 parts of acetic acid were added to 100 parts of a water-dispersible colloidal silica dispersion (Snowtex 30, solid content 30% by weight, supplied by Nissan Chemical Industries, Ltd.) and stirred, and 134 parts of methyltrimethoxysilane was added to the dispersion with cooling with an ice water bath. To the reaction solution obtained by stirring the above mixture at 25° C. for 1 hour were added 20 parts of the tetraethoxysilane hydrolysis condensation solution (Y) and 1 part of sodium acetate as a curing catalyst. The mixture was diluted with 200 parts of isopropanol, to give a coating composition (ii-1).

TABLE 2

| | | | | Examples | | | | | |
|---|---|---|---|---|---|---|---|---|---|
| | | | Unit | 1 | 2 | 3 | 4 | 5 | 6 |
| Composition | Component A | PC | Part by weight | 100 | 100 | 100 | 100 | 100 | 100 |
| | Component B | B-1 | Part by weight | 0.2 | 0.2 | 0.2 | 0.2 | 0.2 | 0.2 |
| | Component C | C1-1 | Part by weight | 0.03 | 0.03 | 0.03 | | 0.03 | 0.03 |
| | | C1-2 | Part by weight | | | | 0.02 | | |
| | | C2-1 | Part by weight | | 0.05 | 0.05 | 0.05 | 0.05 | 0.05 |
| | Component D | D-1 | Part by weight | 0.3 | 0.5 | 0.3 | 0.5 | | 0.5 |
| | | D-3 | Part by weight | | | | | 0.3 | |
| | Component E | E-1 | Part by weight | | | | | 0.002 | 0.002 |
| Properties | | Ff:Fe | — | 14:86 | 14:86 | 14:86 | 14:86 | 14:86 | 14:86 |
| | Transparency | HAZE | % | 0.2 | 0.2 | 0.2 | 0.3 | 0.3 | 0.3 |
| | Durability against molding heat | ΔE | — | 0.3 | 0.3 | 0.3 | 0.4 | 0.3 | 0.4 |
| | Mold release property | Mold release load | N | 1620 | 1620 | 1620 | 1630 | 1640 | 1630 |
| | | Ratio of mold release load (*1) | % | 70 | 70 | 70 | 70 | 71 | 70 |
| | Number of silver streaks occurring on molded article | | — | 0 | 0 | 0 | 0 | 0 | 0 |
| | Strains of molded article | Strain-1 | — | ○ | ○ | ○ | ○ | ○ | ○ |
| | | Strain-2 | — | ○ | ○ | ○ | ○ | ○ | ○ |
| | Cracking test | Cracking during molding | — | ○ | — | ○ | — | — | — |
| | | Cracking after hard coating | — | ○ | ○ | ○ | ○ | ○ | ○ |
| | Weatherability | ΔYI | — | 8.9 | — | 8.6 | — | 8.9 | 8.2 |

*1: Ratio to SRC-I when 0.2 part by weight of Component B is incorporated, and ratio to SRC-II when 0.5 part by weight of Component B is incorporated.

TABLE 3

| | | | | Examples | | | | |
|---|---|---|---|---|---|---|---|---|
| | | | Unit | 7 | 8 | 9 | 10 | 11 |
| Composition | Component A | PC | Part by weight | 100 | 100 | 100 | 100 | 100 |
| | Component B | B-1 | Part by weight | | | 0.5 | 0.5 | 0.2 |
| | | B-2 | Part by weight | 0.2 | | | | |
| | | B-3 | Part by weight | | | | | |
| | | B-4 | Part by weight | | 0.2 | | | |
| | Component C | C1-1 | Part by weight | 0.03 | 0.03 | 0.03 | | 0.03 |
| | | C1-2 | Part by weight | | | | 0.02 | |
| | | C2-1 | Part by weight | 0.05 | 0.05 | 0.05 | 0.05 | 0.05 |
| | Component D | D-1 | Part by weight | 0.5 | 0.5 | 0.3 | 0.5 | |
| | | D-2 | Part by weight | | | | | 0.3 |
| Properties | | Ff:Fe | — | 20:80 | 16:84 | 14:86 | 14:86 | 14:86 |
| | Transparency | HAZE | % | 0.3 | 0.2 | 0.4 | 0.4 | 0.2 |
| | Durability against molding heat | ΔE | — | 0.4 | 0.5 | 0.5 | 0.5 | 0.2 |
| | Mold release property | Mold release load | N | 1390 | 1680 | 1080 | 1080 | 1660 |
| | | Ratio of mold release load (*1) | % | 60 | 72 | 68 | 68 | 72 |

TABLE 3-continued

|  |  | Unit | Examples 7 | 8 | 9 | 10 | 11 |
|---|---|---|---|---|---|---|---|
| Number of silver streaks occurring on molded article |  | — | 0 | 0 | 0 | 0 | 0 |
| Strains of molded article | Strain-1 | — | ◯ | ◯ | ◯ | ◯ | ◯ |
|  | Strain-2 | — | ◯ | ◯ | ◯ | ◯ | ◯ |
| Cracking test | Cracking during molding | — | — | — | ◯ | — | ◯ |
|  | Cracking after hard coating | — | ◯ | ◯ | ◯ | ◯ | ◯ |
| Weatherability | ΔYI | — | — | — | 9.2 | — | 7.9 |

*1: Ratio to SRC-I when 0.2 part by weight of Component B is incorporated, and ratio to SRC-II when 0.5 part by weight of Component B is incorporated.

TABLE 4

|  |  |  | Unit | Comparative Examples 1 | 2 | 3 | 4 |
|---|---|---|---|---|---|---|---|
| Composition | Component A | PC | Part by weight | 100 | 100 | 100 | 100 |
|  | Component B | B-2 | Part by weight |  |  |  |  |
|  |  | B-3 | Part by weight |  | 0.2 | 0.5 |  |
|  |  | B-5 | Part by weight |  |  |  | 0.2 |
|  | Component C | C1-1 | Part by weight | 0.03 | 0.03 |  | 0.03 |
|  |  | C1-2 | Part by weight |  |  | 0.03 |  |
|  |  | C2-1 | Part by weight | 0.05 | 0.05 | 0.05 | 0.05 |
|  | Component D | D-1 | Part by weight | 0.5 | 0.5 | 0.3 | 0.5 |
| Properties |  | Ff:Fe | — | — | 7:93 | 7:93 | 30:70 |
|  | Transparency | HAZE | % | 0.2 | 0.2 | 0.5 | 0.4 |
|  | Durability against molding heat | ΔE | — | 0.3 | 0.3 | 0.6 | 1.5 |
|  | Mold release property | Mold release load | N | 3200 | 2200 | 1550 | 1080 |
|  |  | Ratio of mold release load (*1) | % | — | 94 | 97 | 47 |
|  | Number of silver streaks occurring on molded article |  | — | 0 | 0 | 0 | 15 |
|  | Strains of molded article | Strain-1 | — | X | X | X | ◯ |
|  |  | Strain-2 | — | X | X | Δ | X |
|  | Cracking test | Cracking during molding | — | — | — | ◯ | — |
|  |  | Cracking after hard coating | — | — | — | ◯ | — |
|  | Weatherability | ΔYI | — | — | — | 9.5 | — |

*1: Ratio to SRC-I when 0.2 part by weight of Component B is incorporated, and ratio to SRC-II when 0.5 part by weight of Component B is incorporated.

TABLE 5

|  |  |  | Unit | Comparative Examples 5 | 6 | 7 | 8 | 9 |
|---|---|---|---|---|---|---|---|---|
| Composition | Component A | PC | Part by weight | 100 | 100 | 100 | 100 | 100 |
|  | Component B | B-6 | Part by weight | 0.2 | 0.5 |  |  |  |
|  |  | B-7 | Part by weight |  |  | 0.1 | 0.2 |  |
|  |  | B-8 | Part by weight |  |  |  |  | 0.2 |
|  | Component C | C1-1 | Part by weight | 0.03 | 0.03 | 0.03 | 0.03 | 0.03 |
|  |  | C1-2 | Part by weight |  |  |  |  |  |
|  |  | C2-1 | Part by weight | 0.05 | 0.05 | 0.05 | 0.05 | 0.05 |
|  | Component D | D-1 | Part by weight | 0.5 | 0.3 | 0.3 | 0.5 | 0.5 |
| Properties |  | Ff:Fe | — | 6:94 | 6:94 | — | — | 1:99 |
|  | Transparency | HAZE | % | 0.2 | 0.5 | 0.2 | 0.2 | 0.3 |
|  | Durability against molding heat | ΔE | — | 0.3 | 0.6 | 1.2 | 0.7 | 0.3 |
|  | Mold release property | Mold release load | N | 2350 | 1470 | 2020 | 1470 | 2270 |
|  |  | Ratio of mold release load (*1) | % | 101 | 92 | — | 64 | 98 |
|  | Number of silver streaks occurring on molded article |  | — | 0 | 0 | 0 | 0 | 0 |
|  | Strains of molded | Strain-1 | — | Δ | Δ | X | X | X |

TABLE 5-continued

|  |  | Unit | Comparative Examples | | | | |
|---|---|---|---|---|---|---|---|
|  |  |  | 5 | 6 | 7 | 8 | 9 |
| article | Strain-2 | — | Δ | Δ | X | X | X |
| Cracking test | Cracking during molding | — | — | ○ | X | X | — |
|  | Cracking after hard coating | — | — | ○ | X | X | — |
| Weatherability | ΔYI | — | — | 9.5 | 9.1 | 9.5 | — |

*1: Ratio to SRC-I when 0.2 part by weight of Component B is incorporated, and ratio to SRC-II when 0.5 part by weight of Component B is incorporated.

It is seen from the above Tables that the polycarbonate resin compositions according to the present invention have excellent transparency, durability against molding heat, mold release property and cracking resistance and also have reduced molding-caused strains, and that suitable resin compositions thereof are also excellent in weatherability. When molded, the polycarbonate resin compositions according to the present invention have an excellent mold release property, which is seen not only from the fact that the mold release load and the mold release load ratio are small but also from the fact that a sound made when a molded article is released from a mold is small. Further, while the above polycarbonate resin compositions have excellent mold release properties, they are also excellent in adhesion of hard coatings thereto.

Further, when the above headlamp lens molded articles formed from pellets in Examples were irradiated with an HID lamp (HID handy light pro, white metal halide lamp, supplied by Matsushita Electric Works, Ltd.), it was observed in the molded articles from Examples 5 and 6 that only the circumferential portion of each lens emitted light in bluish color due to fluorescence. That is, these molded articles were headlamp lenses having a specific design performance. The above irradiation was carried out with the HID lamp that was 30 cm distant from the concave side of each lens, and the observation was conducted at an angle of 45° from the central normal line of the convex side of each lens (an oblique angle of 45°).

EFFECT OF THE INVENTION

According to the present invention, there is provided a polycarbonate resin composition which has excellent transparency and durability against molding heat and which gives a molded article having an excellent mold release property, cracking resistance, reduced strains and weatherability.

According to the present invention, there are also provided pellets which are formed from the above polycarbonate resin composition and which are excellent in transparency, heat resistance, mold release property, cracking resistance and weatherability and almost free of strains.

According to the present invention, further, there is provided a molded article which is formed of the above polycarbonate resin composition and which is excellent in transparency, heat resistance, mold release property, cracking resistance and weatherability and almost free of strains.

INDUSTRIAL UTILITY

The molded article of the present invention is excellent in transparency, heat resistance and mold release property, has reduced strains therein and, further, is improved in cracking resistance, so that it is suitable for various transparent members that are required to have high qualities.

Examples of the above transparent members include a transparent member for an automobile, a windowpane for a construction machine, a windowpane for a building, a house and a greenhouse, a roof for a garage or an arcade, a lens for a lighting lamp, a signal lens, a lens for an optical machine or equipment, a mirror, a spectacle lens, goggles, a noise-muffling or absorbing wall, a windshield of a motorcycle, a nameplate, a solar cell cover or solar cell substrate, a cover for a display, a touch panel and parts for play or recreation machines (such as a pinball machine) (a circuit cover, chassis and a pinball conveying guide), The molded article of the present invention is particularly suitably applied to a transparent member for an automobile which member is required to have high qualities and has a large size, and it is applied to a lamp lens for an automobile, particularly to a headlamp lens, more specifically, to a plain headlamp lens. The plain headlamp lens includes a cover for a lamp having a reflector for a beam-condensing function, a cover of lamp unit integrated lamps into articles similar to these.

Therefore, the polycarbonate resin composition of the present invention, pellets thereof and a molded article thereof are useful in the fields of various electronic and electric appliances, office automation equipment, automobile parts, machine parts, agricultural materials, fishery materials, carrying containers, packaging containers, playgame tools and miscellaneous goods. The industrial utility that they have is remarkable.

The invention claimed is:

1. A polycarbonate resin composition obtained by blending 100 parts by weight of a polycarbonate resin (Component A) having a viscosity average molecular weight of 18,000 to 25,000 and 0.005 to 2 parts by weight of an ester (Component B) having an esterification rate of 85% or more, from an aliphatic polyhydric alcohol having 4 to 8 hydroxyl groups and 5 to 30 carbon atoms and an aliphatic carboxylic acid having 10 to 22 carbon atoms, said Component B having a 5% weight loss temperature, measured by TGA (thermogravimetric analysis), of 250 to 360° C. and having an acid value of 5 to 20, and
wherein the aliphatic carboxylic acid of said Component B contains a palmitic acid component and a stearic acid component, and in a peak area by a gas chromatography mass spectrometry method (GC/MS method) thereof, the total of a palmitic acid component area (Sp)

and a stearic acid component area (Ss) is at least 80% of the entire aliphatic carboxylic acid component area, and the area ratio (Ss/Sp) is 1.3 to 30.

2. The polycarbonate resin composition of claim 1, wherein said Component B has a 5% weight loss temperature, measured by TGA (thermogravimetric analysis), of 280 to 360° C.

3. The polycarbonate resin composition of claim 1, wherein said Component B has an acid value of 5 to 18.

4. The polycarbonate resin composition of claim 1, wherein the area ratio (Ss/Sp) is from 1.3 to 10.

5. The polycarbonate resin composition of claim 1, wherein the aliphatic polyhydric alcohol has 5 to 10 carbon atoms.

6. The polycarbonate resin composition of claim 5, wherein the aliphatic polyhydric alcohol represents pentaerythritol and/or dipentaerythritol.

7. The polycarbonate resin composition of claim 1, wherein said Component B has a hydroxyl value in the range of 0.1 to 30.

8. The polycarbonate resin composition of claim 1, wherein said Component B has an iodine value of 10 or less.

9. The polycarbonate resin composition of claim 1, which contains 0.0005 to 1 part by weight, per 100 parts by weight of Component A, of at least one stabilizer (Component C) selected from the group consisting of a phosphorus-containing stabilizer (Component C1) and a hindered-phenol-containing antioxidant (Component C2).

10. The polycarbonate resin composition of claim 1, which contains 0.0005 to 3 parts by weight, per 100 parts by weight of Component A, of an ultraviolet absorbent (Component D).

11. The polycarbonate resin composition of claim 1, which contains 0.0001 to 3 parts by weight, per 100 parts by weight of Component A, of a fluorescent brightener (Component E).

12. The polycarbonate resin composition of claim 1, which shows a haze value in the range of 0.1 to 1% as a 2 mm thick smooth flat plate having an arithmetic average roughness (Ra) of 0.03 μm, and contains no filler.

13. A polycarbonate resin composition comprising 100 parts by weight of a polycarbonate resin (Component A) having a viscosity average molecular weight of 18,000 to 25,000 and 0.005 to 2 parts by weight of an ester (Component B) having an esterification rate of 85% or more, from an aliphatic polyhydric alcohol having 4 to 8 hydroxyl groups and 5 to 30 carbon atoms and an aliphatic carboxylic acid having 10 to 22 carbon atoms, wherein the aliphatic carboxylic acid of said Component B contains a palmitic acid component and a stearic acid component, and in a peak area by a gas chromatography mass spectrometry method (GC/MS method) thereof, the total of a palmitic acid component area (Sp) and a stearic acid component area (Ss) is at least 80% of the entire aliphatic carboxylic acid component area, and the area ratio (Ss/Sp) is 1.3 to 30, and the polycarbonate resin composition being a composition in which the molar ratio (Ff:Fe) of the molar amount (Ff) of carboxyl groups of free aliphatic carboxylic acid and the molar amount (Fe) of ester bonds of Component B is in the range of 8:92 to 30:70.

14. The polycarbonate resin composition of claim 13, which contains 0.0005 to 1 part by weight, per 100 parts by weight of Component A, of at least one stabilizer (Component C) selected from the group consisting of a phosphorus-containing stabilizer (Component C1) and a hindered-phenol-containing antioxidant (Component C2).

15. The polycarbonate resin composition of claim 13, which contains 0.0005 to 3 parts by weight, per 100 parts by weight of Component A, of an ultraviolet absorbent (Component D).

16. The polycarbonate resin composition of claim 13, which contains 0.0001 to 3 parts by weight, per 100 parts by weight of Component A, of a fluorescent brightener (Component E).

17. Pellets formed of a resin composition comprising 100 parts by weight of a polycarbonate resin (Component A) having a viscosity average molecular weight of 18,000 to 25,000 and 0.005 to 2 parts by weight of an ester (Component B) having an esterification rate of 85% or more, from an aliphatic polyhydric alcohol having 4 to 8 hydroxyl groups and 5 to 30 carbon atoms and an aliphatic carboxylic acid having 10 to 22 carbon atoms, said Component B having an acid value of 5 to 20, and wherein the aliphatic carboxylic acid of said Component B contains a palmitic acid component and a stearic acid component, and in a peak area by a gas chromatography mass spectrometry method (GC/MS method) thereof, the total of a palmitic acid component area (Sp) and a stearic acid component area (Ss) is at least 80% of the entire aliphatic carboxylic acid component area, and the area ratio (Ss/Sp) is 1.3 to 30, and wherein said pellets satisfy the requirement that the mold release load of said pellets in a mold release load measurement method is 85% or less of the mold release load, measured by said measurement method, of pellets formed from a resin composition containing said Component A and pentaerythritol tetrastearate which has an acid value of 0.8, has a 5% weight loss temperature, measured by TGA (thermogravimetric analysis), of 396° C., and is incorporated in an amount equivalent to the amount of said Component B.

18. The pellets of claim 17, wherein the molar ratio (Ff:Fe) of the molar amount (Ff) of carboxyl groups of free aliphatic carboxylic acid and the molar amount (Fe) of ester bonds of Component B in said pellets is in the range of 10:90 to 30:70.

19. The pellets of claim 17, wherein said aliphatic polyhydric alcohol is pentaerythritol.

20. The pellets of claim 17, which show a haze value in the range of 0.1 to 1% as a 2 mm thick smooth flat plate formed from them having an arithmetic average roughness (Ra) of 0.03 μm, and contain no filler.

21. A molded article formed of the polycarbonate resin composition recited in claim 1.

22. A molded article formed of the polycarbonate resin composition recited in claim 13.

23. A molded article formed from the pellets recited in claim 17.

24. The molded article of claim 21, which has a surface on which a hard coating is formed.

25. The molded article of claim 24, which is for use as a transparent member for an automobile.

26. The molded article of claim 25, wherein the transparent member for an automobile is a lamp lens for an automobile.

27. The molded article of claim 22, which has a surface on which a hard coating is formed.

28. The molded article of claim 27, which is for use as a transparent member for an automobile.

29. The molded article of claim 28, wherein the transparent member for an automobile is a lamp lens for an automobile.

30. The molded article of claim 23, which has a surface on which a hard coating is formed.

31. The molded article of claim 30, which is for use as a transparent member for an automobile.

32. The molded article of claim 31, wherein the transparent member for an automobile is a lamp lens for an automobile.

* * * * *